United States Patent [19]
Muesse et al.

[11] 3,936,828
[45] Feb. 3, 1976

[54] VLF NAVIGATION SYSTEM

[75] Inventors: Allen R. Muesse, Orange; Jess C. Wright, El Cajon, both of Calif.

[73] Assignee: Communications Components Corporation, Costa Mesa, Calif.

[22] Filed: Nov. 19, 1973

[21] Appl. No.: 417,384

Related U.S. Application Data

[63] Continuation-in-part of Ser. No. 317,738, Dec. 22, 1972, abandoned.

[52] U.S. Cl........ 343/105 R; 235/150.27; 343/112 D
[51] Int. Cl.[2]........................................... G01S 1/30
[58] Field of Search............... 343/105 R, 112 D; 235/150.27, 150.272

[56]       References Cited
       UNITED STATES PATENTS
3,440,535   4/1969   Thornhill................ 343/105 X
3,747,106   7/1973   Dalabakis................ 343/112 D

*Primary Examiner*—T. H. Tubbesing
*Assistant Examiner*—Richard E. Berger
*Attorney, Agent, or Firm*—Harvey C. Nienow

[57]       ABSTRACT

A VLF navigation system suitable for highly accurate worldwide aircraft navigation utilizing existing VLF transmitting stations on a "dead reckoning" basis with initial and intermediate fixes. The system is enabled to utilize all existing VLF transmitting stations regardless of station frequency by novel receiver phase-locked loop means which normalizes all station frequencies to phase coherent independent data signals of a common working frequency. In one form of the invention, utilizing hyperbolic coordinates, both RF stations of each station pair utilized for computation are such VLF transmitting stations; while in another form of the invention, utilizing Rho-Rho coordinates, one RF station of each station pair is an on-board frequency standard normalized to the common working frequency, and the other station of each pair is one of the VLF transmitting stations.

Computer means, which may be part of the "on-board" equipment, selects station pairs for optimum station geometry and range, and by comparing the phase differences between the phase coherent data signals for respective station pairs, determines a Δ time and hence a Δ position in suitable coordinates from the initial or intermediate calibration point. Novel multiplexing and counting means, and logic circuitry associated therewith, enable a single counting means to be rapidly sequentially employed by the computer to make the time difference comparison for a series of station pairs.

The system is extremely accurate for a number of reasons, including but not limited to the inherent frequency stability of VLF transmitting stations (which are generally atomic clock controlled); the inherent minimal distortion of VLF electromagnetic signals over very long ranges; the fact that errors are not cumulative in the system; and a station pair averaging capability which decreases random errors and permits rejection of the defective signals.

73 Claims, 41 Drawing Figures

CURRENTLY AVAILABLE STATIONS

| CALL LETTERS | LETTER REF. | NAME | LOCATION | $f_o$ (KHz) | $P_o$ (KW) |
|---|---|---|---|---|---|
| NAA | ME | MAINE | 44°38'9"N 67°16'9"W | 17.80 | 1000 |
| NSS | MD | MARYLAND | 38°59'1"N 76°27'2"W | 21.40 | 85 |
| NBS | P | PANAMA | 09°03'3"N 79°38'9"W | 24.00 | 150 |
| OMEGA | T | TRINIDAD | 10°42'06"N 61°38'20"W | 12.00 | 0.8 |
| NLK | W | WASHINGTON | 48°12'2"N 121°55'0"W | 18.60 | 250 |
| NPM | H | HAWAII | 21°25'5"N 158°09'3"W | 23.40 | 140 |
| NWC | A | AUSTRALIA | 21°49'0"S 114°09'8"E | 22.30 | 1000 |
| GBR | GB | GT.BRITAIN | 52°22'N 01°11'W | 16.00 | 60 |
| NDT | J | JAPAN | 34°58'N 137°01'W | 17.40 | 50 |
| OMEGA | N | NORWAY | 66°25'15"N 13°09'10"E | 12.30 | 4 |
| | | ALTERNATE | | | |
| | | ALTERNATE | | | |

FIG.5

VLF HYPERBOLIC LINES EXAMPLE SHOWING TYPICAL GEOMETRY

VLF HYPERBOLIC LINES OF CONSTANT TIME DIFFERENCE BETWEEN STATION PAIRS (A,B) AND (C,D)

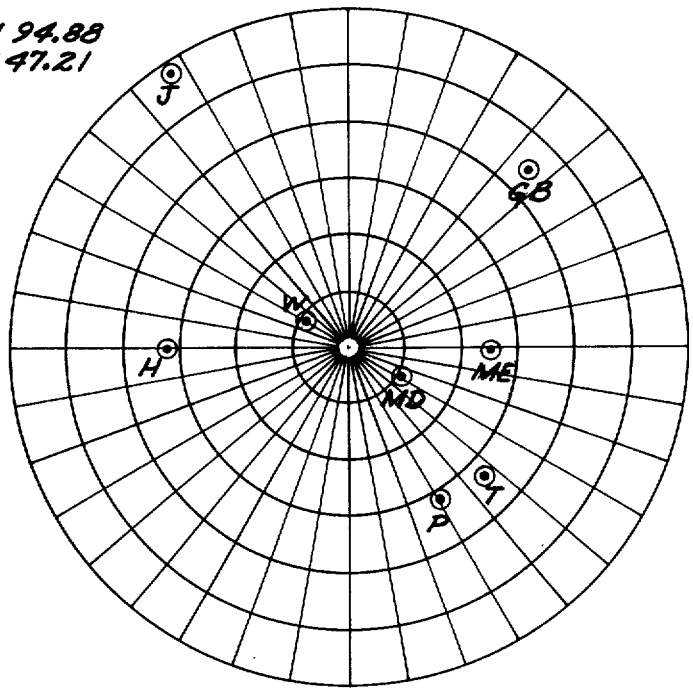
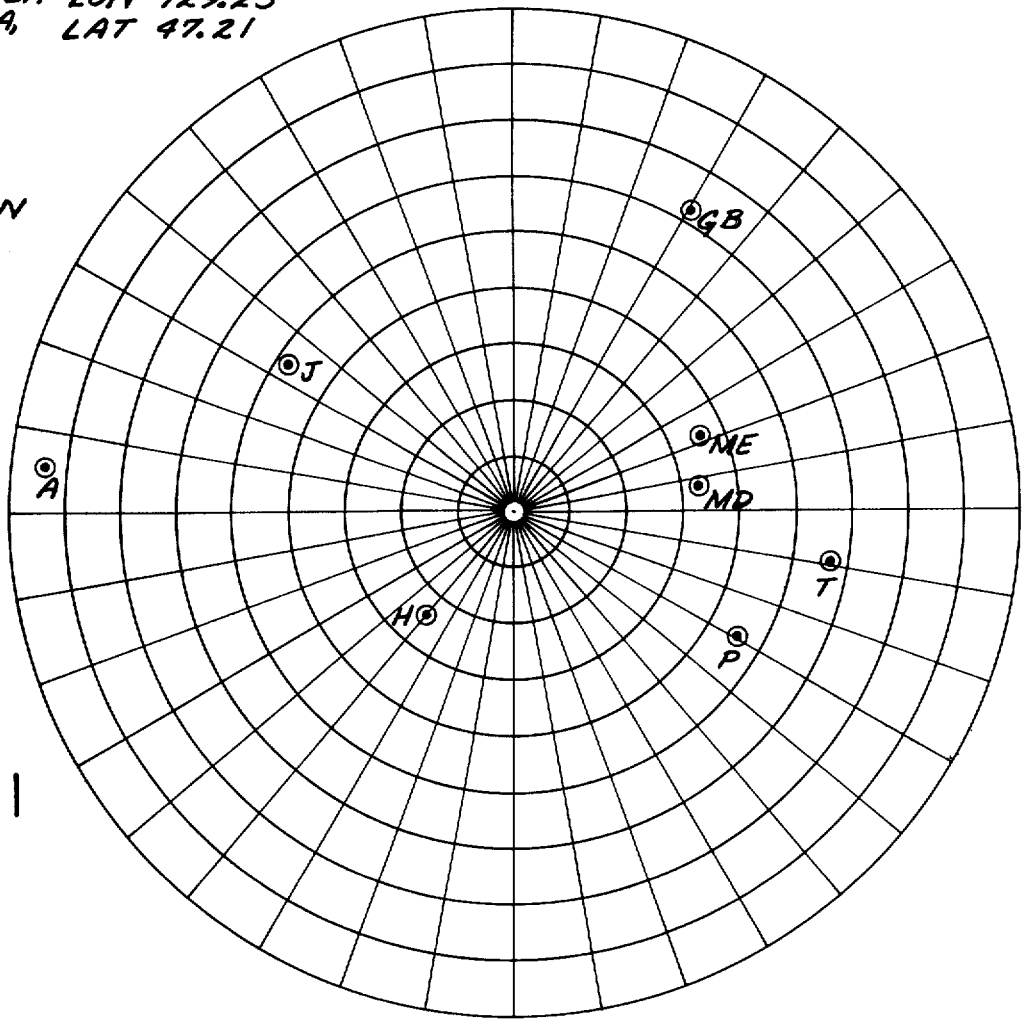

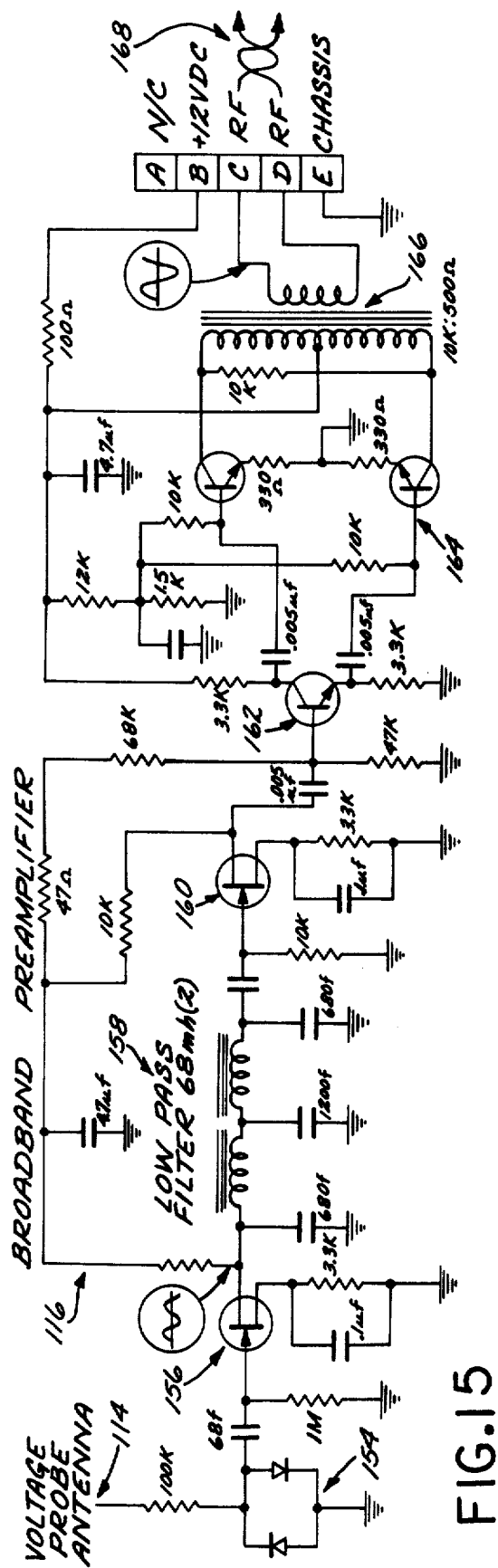
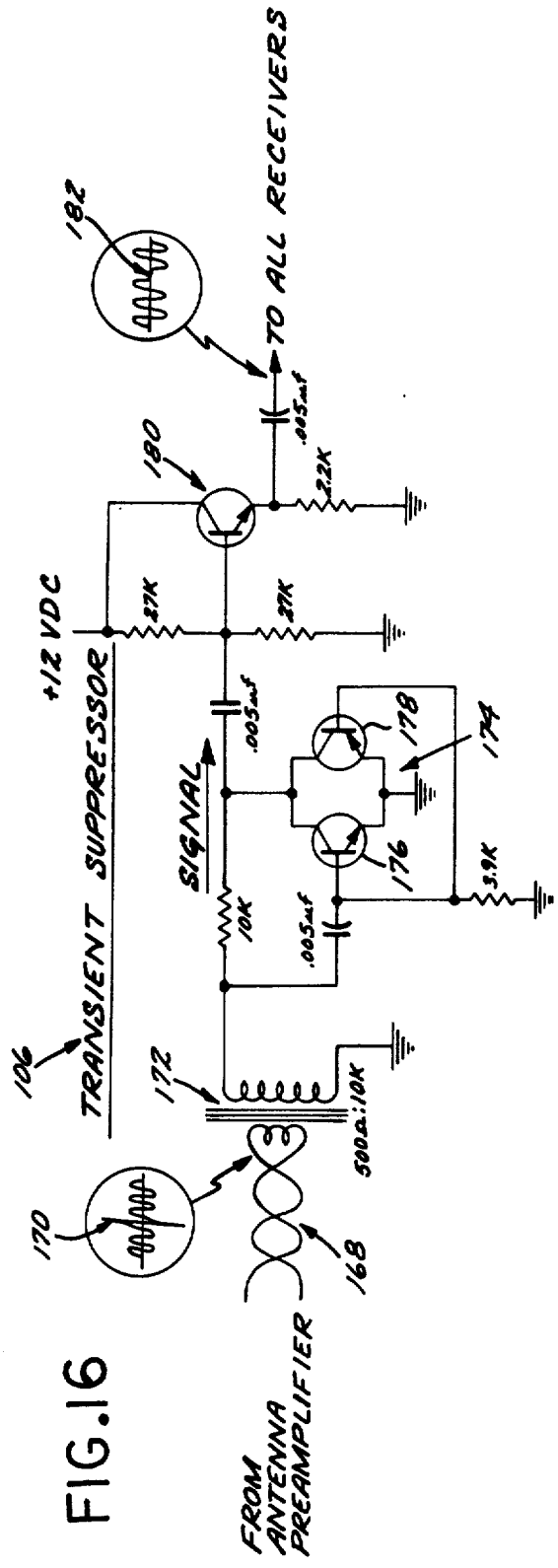
FIG.15
FIG.16

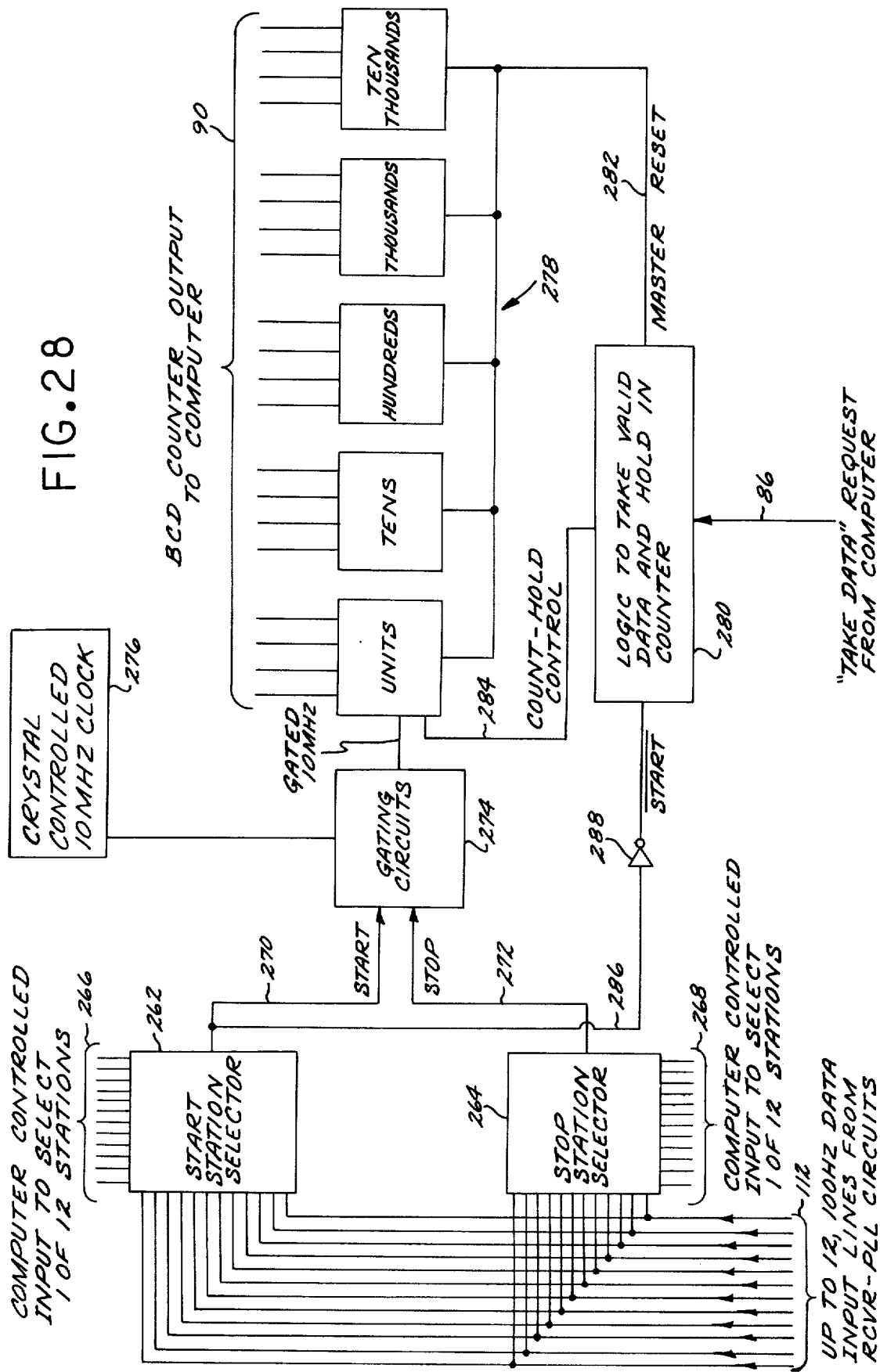

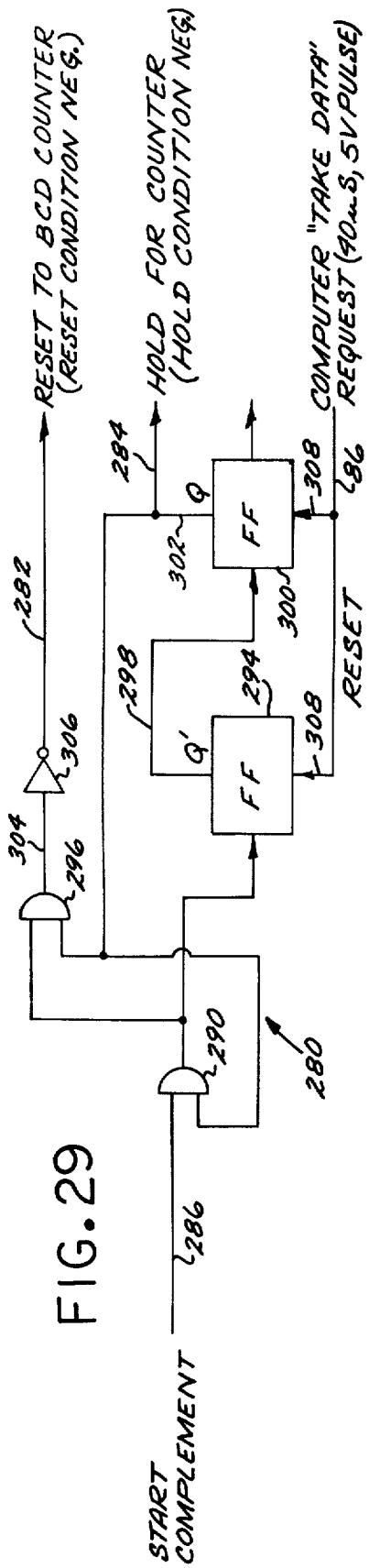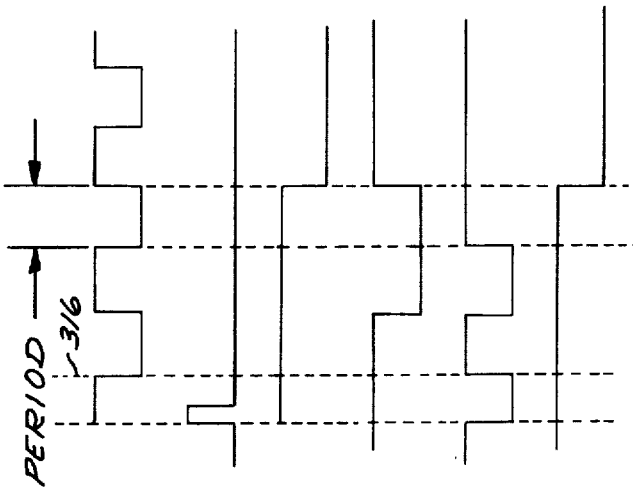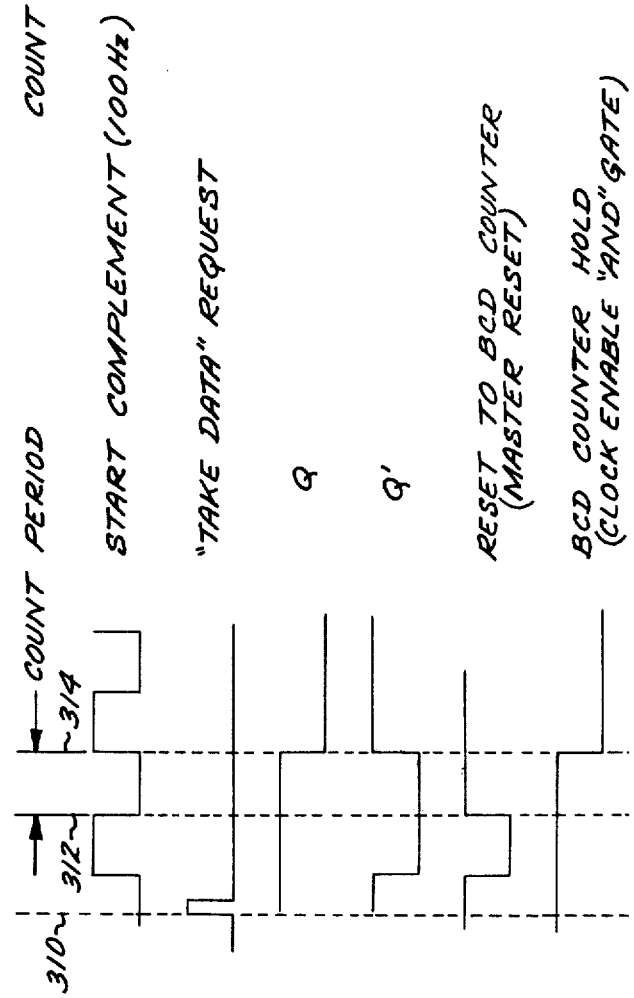

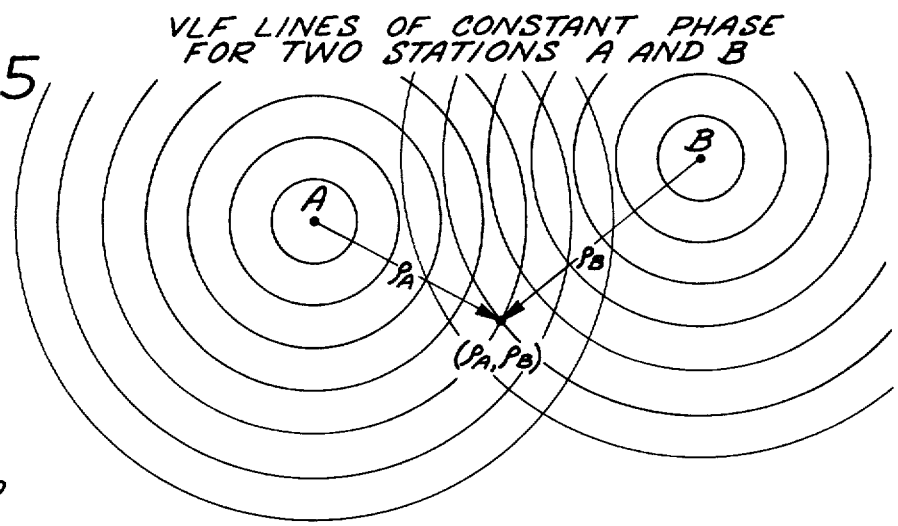
FIG. 35 VLF LINES OF CONSTANT PHASE FOR TWO STATIONS A AND B
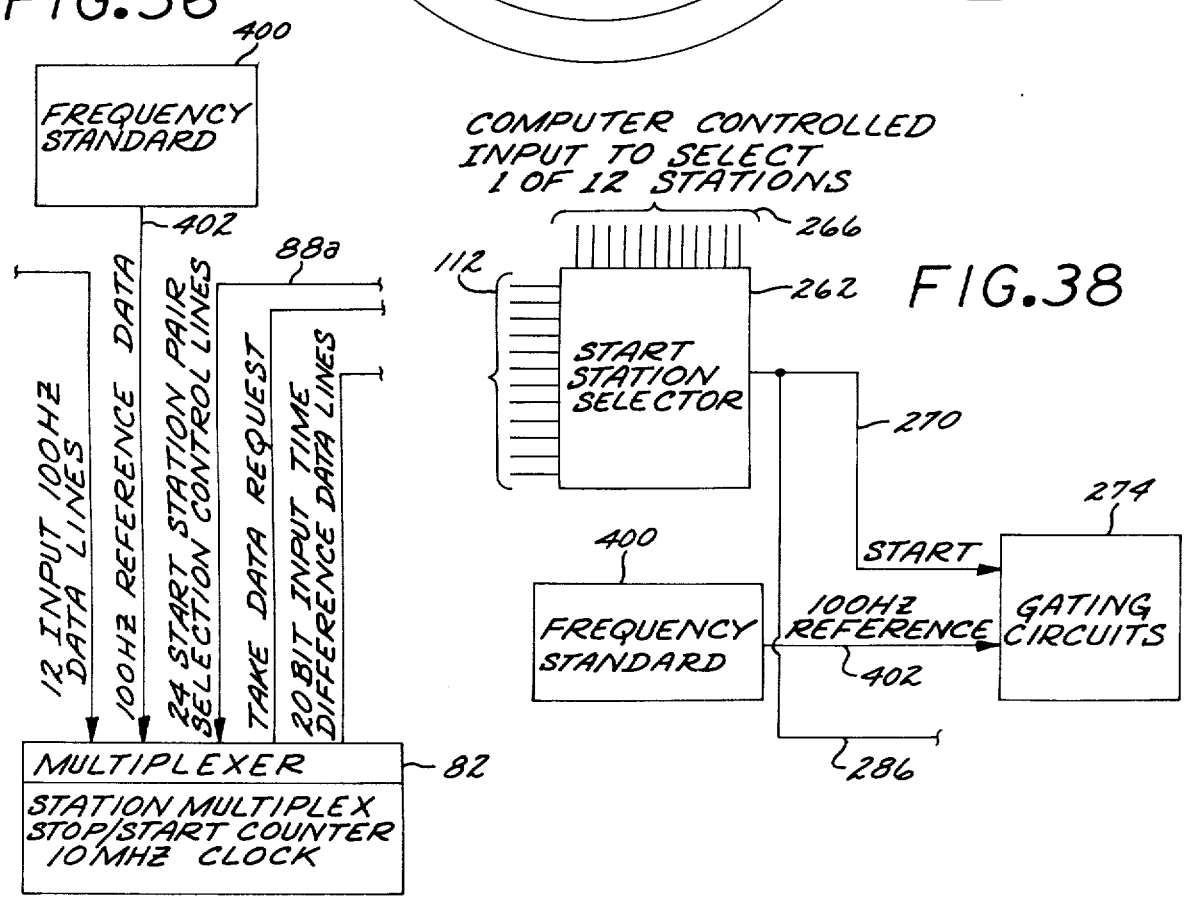
FIG. 36
FIG. 38
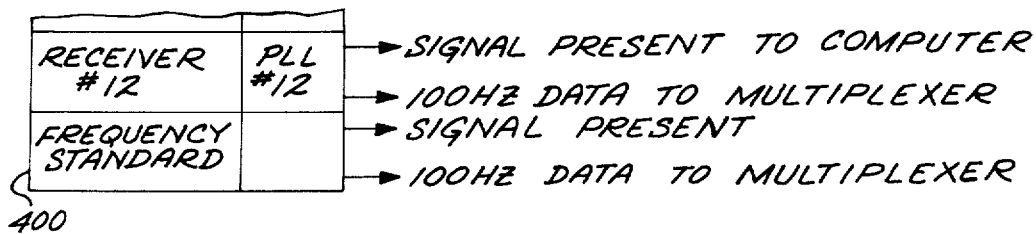
FIG. 37

VLF NAVIGATION SYSTEM

RELATED APPLICATIONS

This is a continuation-in-part of our co-pending application Ser. No. 317,738, now abandoned, filed Dec. 22, 1972 for VLF NAVIGATION SYSTEM.

BACKGROUND OF THE INVENTION

The present invention has particular utility and important advantages as applied to aircraft navigation, and hence much of the discussion herein relating to the background of the invention and to the objects and advantages thereof, as well as the detailed description of a particular embodiment of the invention, will be directed toward the aircraft navigation aspect of the invention. Nevertheless, as will become apparent hereinafter, the present system and/or portions thereof are equally well suited for a variety of other types of navigation, and accordingly the present system and various inventive aspects thereof are not limited to use in connection with aircraft navigation.

Early aircraft navigation systems were principally of the "point source" type, and these point source navigation systems still are by far the most widely used type systems in aircraft navigation today. Point source navigation systems include such systems as "ADF" (automatic direction finding equipment); marker beacons; "VOR" (VHF omnirange stations); and "DME" (distance measuring equipment).

The ADF spectrum is generally from about 190 KHz to about 1750 KHz, and generally includes LF (low frequency) and MF (medium frequency) non-directional beacons and AM commercial broadcast stations.

Marker beacons set at 75 MHz have been operational for many years along U.S. federal airways, but are currently being phased out as an en route aid. They are still standard along instrument landing approaches.

VOR (sometimes referred to as "Omni" stations are internationally standardized for use by aircraft, in the frequency range of 108 MHz to 118 MHz. These stations provide bearing information relative to the respective stations, and the techniques have been greatly refined in recent years in an attempt to reduce site errors and ambiquities. VOR navigation is probably the most widely used form of aircraft navigation throughout the world today.

DME is a pulse-ranging system for aircraft, in the 960–1215 MHz band, and involves pulsed transmission from the aircraft and a return pulse from a ground station after a fixed delay.

VOR and DME are now frequency colocated to form a single site area coverage system, which is a Rho-Theta area coverage grid system. For each VOR frequency there is paired DME frequency, and a common channel selector is provided in compatible airborne equipment. The U.S. VORTAC, for example, is a VOR/DME system utilizing the DME function of the military TACAN (UHF tactical air navigational aid) system for distance measurement.

These point source type navigation systems, while useful in making approaches, are generally inadequate for en route navigation, and particularly for navigation on a worldwide basis which involves flying over great expanses of water and large primitive land masses.

Similarly, the area navigation combinations of such point source navigation systems, as for example VOR/DME, are generally inadequate, and involve serious problems. Thus, these systems utilize VHF and/or UHF, both of which are very limited in range, and are generally "line of sight". Accordingly, each such station only covers a very limited surrounding area, so that literally hundreds of stations are required to cover even the limited area of the United States. Even then, for reliability, due to the likelihood of station failure, even that number must be multiplied with backup equipment and overlapping station coverage. Such point source type area navigation equipment requires manual station selection, and frequent reselection because of the short range. Also, such equipment is generally subject to station errors and obstructions.

Nevertheless, for lack of a better system prior to the present invention, this VOR/DME type area navigation equipment is currently being widely implemented by the U.S. Government on a national basis.

One approach which has recently come into some use in commercial aviation to give more flexibility in area navigation is the inertial navigation system. This is a true "area" navigation system of the dead reckoning type, wherein an airborne computer provides position, ground speed, heading, time and distance to go to destination or a selected waypoint, and the like. The computer is fed inertial information from a series of accelerometers and gyros. Such inertial navigation systems are extremely expensive and are very heavy and bulky due to the nature of the sensors, and they are therefore only suitable for very large commercial and military aircraft of the intercontinental type. Inertial navigation systems also have the disadvantage of being subject to cumulative errors from the point of departure. Accordingly, such inertial systems appear to have only very limited usefulness in aircraft navigation.

Another group of navigation systems employed for area navigation is the "hyperbolic" group of navigation systems wherein navigational position fixes are made by time referencing signals from a plurality of widely spaced ground stations in a hyperbolic coordinate system related to the ground stations. Such hyperbolic-type navigation systems have the advantage of utilizing low frequencies, generally on the order of from about 10 KHz to about 130 KHz, which greatly extends the station range from hyperbolic systems as compared to point source area navigation systems, thereby permitting navigation over large areas with the use of only a very few stations. Hyperbolic navigation systems also have the advantage that they have great inherent accuracy because of the good frequency stability that can be produced in this low frequency range, although such accuracy depends entirely upon the capability of the system to produce close synchronization between transmitted signals and receiver reference signals. Hyperbolic navigational systems also have the advantage that, assuming the transmitted signals and receiver reference signals can be accurately synchronized, errors are generally not cumulative in nature.

One of the major problems in connection with prior art hyperbolic navigation systems is that very complicated and expensive hardware has generally been required in order to provide the necessary signal synchronization. Principal prior art hyperbolic systems include "Decca", "Loran", and "Omega" systems, all of which involve such complex and expensive hardware that they are primarily useful only for ship navigation, and not practical for aircraft navigation.

The Decca system requires a "master" and three "slave" ground stations for each area of coverage, with the accompanying undesirable multiplication of hardware. Decca is in the 70 KHz to 130 KHz frequency range, which is considerably above the 3 to 30 kilohertz VLF range and therefore does not have the advantage of great undistorted range of a VLF system.

Loran requires a master and two slave ground stations, all of which are atomic clock controlled. The Loran system utilizes a 100 KHz frequency, which is undesirably high, and in order to overcome the resulting ionospheric reflection problem, Loran utilizes a special pulsed waveform and gating.

The Omega system has the advantage of being in the true VLF frequency range, between about 10 KHz and about 14 KHz, but has the disadvantage of requiring an atomic clock on board which was initially started in synchronism with the ground station clocks.

These prior art hyperbolic navigation systems are intended to provide absolute positioning, rather than dead reckoning with initial and intermittent position fixing, and such absolute positioning requirement necessitates the excessive and expensive hardware such as atomic clocks, master and slave stations, and the like, employed in the systems.

There have been recent efforts to avoid the use of atomic clocks on board and to reduce the hardware requirement in a hyperbolic navigation system by having receivers with oscillator twelve adapted to be phase-locked to respective transmitter station signals. However, such efforts have generally resulted in equipment having a navigational capability that is unduly limited and uncertain. Such prior art efforts in this direction could not accommodate random area navigation, but required pre-selection of the particular route to be flown between two points, and then prior to take-off the time signals and differences to be utilized had to be looked up in a large book of tables. Only a fraction of the existing VLF transmitting stations could be used which had frequencies capable of being matched by binary division. Lock-on of the receivers to respective station signals was very slow, and under extreme temperature conditions lock-on would not occur at all. Such prior art equipment had no capability for station averaging or diurnal shift correction, or the like. Because of the restricted number of VLF stations that could be used in such system, and the requirement of a pre-selected route, it was not generally suitable for navigation on a worldwide basis.

A problem in connection with all of these prior art hyperbolic-type navigation systems has been to convert the hyperbolic lines of time/position into a meaningful display, and particularly to provide such conversion in a sufficiently compact package for widespread availability and so as to be suitable for use in other than ships or large aircraft; i.e., suitable for use even in small aircraft, and in ground vehicles.

The VLF frequency range is generally not subject to shadowing, and will permeate areas in the middle of numerous obstructions, as for example city streets despite the presence of tall buildings and other obstructions. Accordingly, the VLF frequency range is inherently particularly suitable for use in ground vehicle location and control (which is currently handled principally by VHF equipment that is particularly subject to interference from physical obstructions). However, the prior art VLF navigation systems have generally been much too cumbersome and expensive for such purpose.

SUMMARY OF THE INVENTION

In view of these and other problems in the art, it is a general object of the present invention to provide a novel navigation system of the area type which utilizes the advantages of the VLF electromagnetic frequency spectrum for accuracy, stability, and wide area coverage, yet which requires a minimum amount of mobile or airborne hardware.

Another object of the invention is to provide a novel VLF navigation system on either a hyperbolic or a Rho-Rho coordinate basis which embodies mobile or airborne receiver means that is compatible with any VLF frequency, whereby the system is capable of utilizing any and all available VLF transmitter stations regardless of the transmitted modulation. This capability enables the system to be utilized on a worldwide navigational basis utilizing currently available VLF communication signals and/or Omega timing signals.

Another object of the invention is to provide a novel VLF navigation system utilizing either hyperbolic or Rho-Rho coordinates wherein the lines of time/position are converted into a meaningful display that is continually upgraded by computer means, including such information as present longitude and latitude, distance and heading to destination or a waypoint, distance and reciprocal heading, groundspeed, and time to touchdown or a waypoint.

Another object of the invention is to provide a novel VLF area navigation system which has complete flexibility in route selection and in the selection of new routes while in transit.

Another object is to provide an area navigation system which, although utilizing hardware of modest extent, is extremely accurate, generally being capable of defining position accuracy (in terms of longitude and latitude) at any point around the world to within several hundred meters.

One factor contributing to this extreme accuracy is the use of VLF electromagnetic signals as the basis for navigation, preferably within the frequency range of from about 10 KHz to about 25 KHz, but if desired over the entire VLF frequency spectrum, which is considered to be from 3KHz to 30 KHz. In the VLF frequency range, there is no appreciable "shadowing" of the received signal, even in valleys behind hills, and even in areas with a multitude of obstructions, such as in cities. For example, VLF signals can be picked up without much degradation even inside of a building.

The ionosphere functions like a natural wave guide for VLF electromagnetic radiations, so that the VLF waves will go clear around the globe without reflecting, which causes ambiguities with higher frequencies.

Another factor contributing to the extreme accuracy of the present system is related to the capability of "locking on" to all VLF station frequencies within range. This allows a sufficient number of stations for station averaging to improve accuracy, and as a part of the averaging function any station outside of a reasonable average may be rejected to maintain accuracy. This accessibility to numerous station frequencies also enables station signals that are degraded by the diurnal shift ("night effect") to be programmed for correction in the computer forming a part of the apparatus.

Another factor contributing to the accuracy of the present system, as well as enabling the system to utilize any and all VLF frequencies, and also minimizing the hardware requirement, is novel receiver phase-locked loop means which normalizes all station frequencies to independent phase coherent data signals for a common working frequency. These phase coherent data signals for all VLF stations in range provide time difference data that is readily measured and converted to position data in the coordinates from the initial or an intermediate calibration point.

Still another factor in the accuracy of the system and the minimization of hardware is novel multiplexing and counting means, including logic circuitry, enabling a single counter to be rapidly sequentially employed by the computer of the system to make the time difference comparison for a series of station pairs.

Accuracy of the present system is maintained during a navigational sequence because errors tend to be random, both for the transmitter station coordinate system and for the phase-locked loop and time difference measuring portions of the system.

The extreme accuracy of the system is not rendered uncertain by any ambiguity or anomaly, since time difference information for a particular direction of travel is counted only up to a quarter cycle of the normalized data frequency. With the presently preferred normalized data frequency of 100Hz such quarter wave corresponds to a little over 400 nautical miles. The computer automatically recalibrates the phase coherent receiver data signals within this distance to avoid possible ambiguity or anomaly.

While the present invention is described herein primarily with respect to airborne navigational equipment for providing such navigational information as position, distance and heading (or reciprocal heading) to a target, groundspeed, and time to a target, it is to be understood that the present system and specific portions thereof are also readily adaptable for providing other navigational information, and for other general purposes than airborne navigation. For example, inputs can be added other than those specifically referred to herein to expand the functions, some examples being: (1) speed or velocity indication; (2) by the input of altitude information, glide slope information can be a product; (3) air data systems; (4) determination of wind and vectors; (5) can tie in with inertial systems and doppler and other navigation systems such as Loran and radar.

In addition to airborne navigation, it is contemplated that the present VLF system or portions thereof may also be utilized in some or all of the following: (1) collision avoidance, air and marine, above surface, surface, and subsurface; (2) marine navigation, surface and subsurface; (3) vehicular location and control (police, cabs, trains, and the like); (4) programmable automatic navigation; (5) Man pack (police, search, or the like); (6) geological survey; (7) reconnaissance; (8) remote position indicator; (9) airport ground control.

While the computer of the present system is described herein as part of the airborne equipment, it is to be understood that for some of the above additional uses it will be desirable to have one or more ground station computers which can perform all or some of the functions of the present airborne computer.

For example, in aircraft collision avoidance systems, the time difference information from the receiver phase-locked loops of the present system may be transmitted via radio signals to a ground station for processing and comparison with similar signals for other aircraft so as to determine the positions of the aircraft with respect to each other. Similarly, with vehicular location and control, it may be desirable to utilize a central computer which presents the vehicular position information to an operator at a fixed station.

Thus it is that the invention provides a navigation method in which two signals of different frequency are normalized or converted to two other signals of like frequency which are coherent. The phase difference between those two other signals is measured. It is measured by forming those two other signals as repetitive waves having similar shape and measuring the time that elapses between corresponding portions of the two waves. That has a number of advantages, one of which is that normalizing of both signals can be accomplished by using a common signal. That is accomplished in a preferred form of the invention by using dividers in the normalizing process and using the same signal to control operation of all dividers. The result is a high degree of accuracy. Phase is measured directly rather than indirectly by measuring error signal or the like.

The common normalizing signal may be derived from the on-board clock in the case where one of the "two other signals" is provided by such a clock. In addition to the method, the invention relates to apparatus with which to practice that invention and a preferred form of that method is described broadly as the method of converting an RF signal of one frequency into a normalized signal of another frequency, which comprises the steps of providing an oscillator signal for said RF signal which has a frequency that is a multiple of said RF signal frequency, said oscillator frequency being divisible by an integer to said normalized signal frequency, phase locking said oscillator signal to said RF signal, and dividing said oscillator signal by said integer to produce said normalized signal.

Another preferred form of the method is described as the method of making a phase difference comparison between first and second phase separated low frequency digital electrical waveforms having the same frequency, which comprises providing a string of high frequency electrical clock pulses, gating said clock pulses on by a leading edge of said first waveform, gating said clock pulses off by the corresponding leading edge of said second waveform, and counting the gated pulses.

The invention also envisions a preferred form of apparatus described broadly as comprising apparatus for converting an RF signal of one frequency into a normalized signal of another frequency, which comprises a phase-locked loop for said RF signal, said loop including an oscillator which has a frequency that is a multiple of said RF signal frequency, said oscillator frequency being divisible by an integer to said normalized signal frequency, divider means connected to said oscillator and arranged to divide the oscillator signal by said integer to produce said normalized signal.

It also envisions apparatus described broadly as comprising apparatus for comparing the phase difference between first and second phase separated low frequency digital waveforms having the same frequency, which comprises gating circuit means, first and second input connections to said gating circuit means applying the respective said first and second waveforms to said gating circuit means, a clock connected to said gating circuit means and providing a string of high frequency electrical pulses to said gating circuit means, an output from said gating circuit means, and counting means having an input connected to said gating circuit means output for counting gating clock pulses, said gating circuit means being adapted to gate said clock pulses to said counting means by a leading edge of said first waveform and to gate off said clock pulses from said counting means by the corresponding leading edge of said second waveform, whereby the number of said clock pulses counted by said counting means will be in direct proportion to said phase difference.

Further objects and advantages of the present invention will appear during the course of the following part of the specification, wherein the details of construction, mode of operation, and novel method steps of a presently preferred embodiment are described with reference to the accompanying drawings, in which:

BRIEF DESCRIPTION OF THE DRAWINGS

FIG. 5 is a chart giving details of the VLF transmitting stations indicated on the world map of FIG. 4.

FIG. 10 is a polar plot similar to FIG. 9 illustrating station pairs available for navigation with a present position at southwest Ontario, Canada.

FIG. 11 is a polar plot similar to FIGS. 9 and 10 illustrating station pairs available for navigation with the present system with a present position at southwest British Columbia, Canada.

FIG. 15 is a detailed circuit diagram of a broadband preamplifier suitable for amplification of all of the incoming VLF signals, and preferably housed at the base of the voltage probe antenna employed to intercept the signals.

FIG. 16 is a circuit diagram of a transient suppressor through which all of the VLF signals pass.

FIG. 28 is a block diagram of a multiplexer and time difference digitizer employed in the present system for determining time difference data sequentially from any number of transmitting station pairs selected by the computer.

FIG. 29 is a logic diagram for the logic block in FIG. 28 that assures the data taken is a full, valid count and holds such data in the counter of FIG. 28 until a new "take data" request is received from the computer.

FIGS. 30 and 31 show time event waveforms for the logic diagram of FIG. 29, for two different input conditions to the logic diagram of FIG. 29 when the take data request is received from the computer.

FIG. 35 is a graphical illustration of VLF lines of constant phase providing a Rho-Rho coordinate system for two VLF transmitting stations.

FIG. 36 illustrates modifications in the overall block diagram of FIG. 12 which adapt the system to the use of an on-board frequency standard.

FIG. 37 illustrates a modification of the input block diagram of FIG. 13 to include an on-board standard.

FIG. 38 illustrates a manner in which the multiplexer of FIG. 28 may be modified to adapt that portion of the system to the use of an on-board standard.

DETAILED DESCRIPTION

The following detailed description will be directed particularly to a VLF navigation system according to the invention which is particularly adapted for airborne navigation, and wherein the computer portion of the system is a part of the airborne equipment. It is to be understood, however, that the principles of the invention are equally adaptable to other arrangements as indicated hereinabove, and that in some systems utilizing the principles of the invention the computer may be disposed in a fixed, central location and receive position information from one or more mobile units through radio communication.

Figure 1:
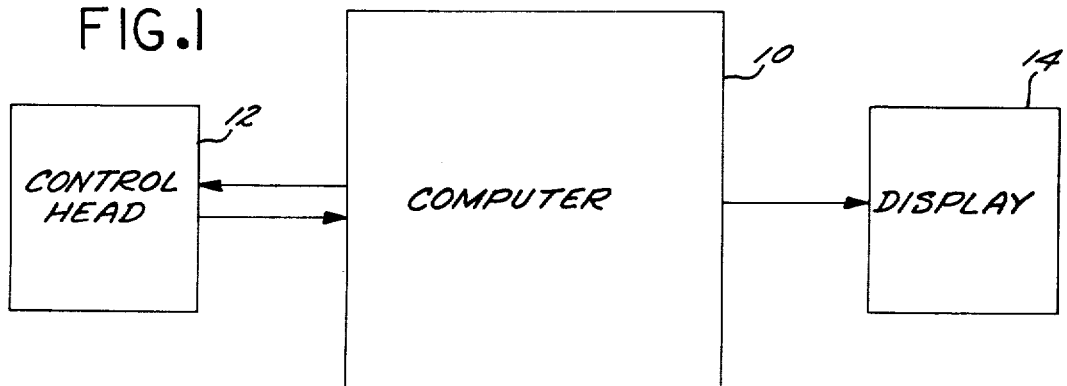
FIG. 1 is a general block diagram illustrating the relationship of the computer, control head, and display portions of the present navigation system.

FIG. 1 of the drawings provides a general indication of the relationship between the computer 10 and the two units with which the operator has direct communication, namely, the control head 12 and the display unit 14. The control head 12 is the interface between the operator and the computer 10. The control head 12 serves as the data input source to the computer, and it also informs the computer what information is to be displayed on the display unit or panel 14.

Figure 2:
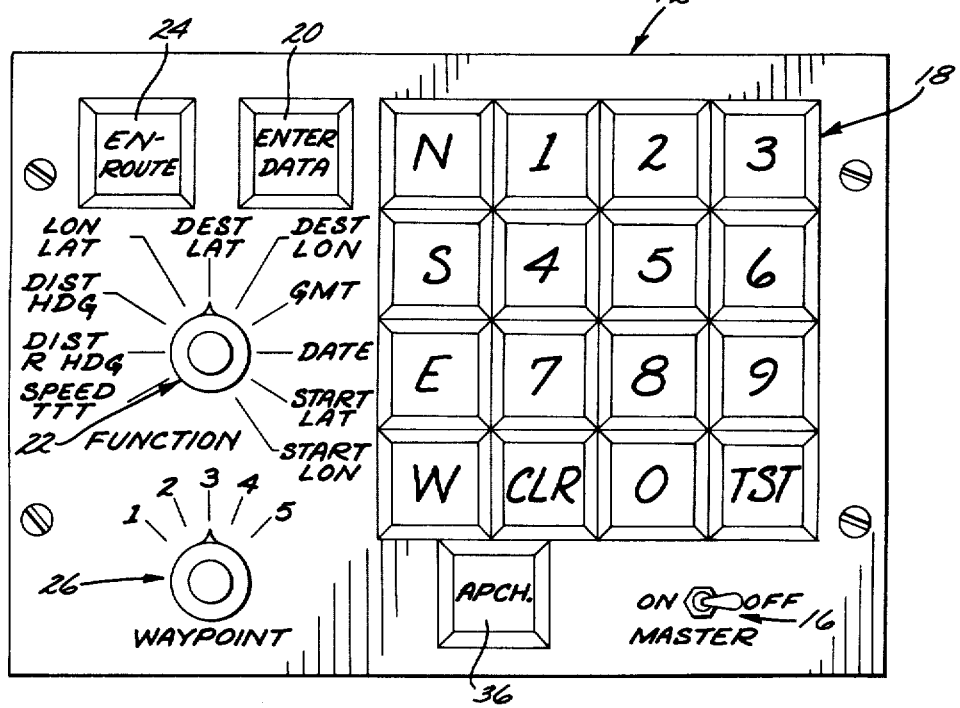
FIG. 2 is a plan view of a control head suitable for an airborne navigation system according to the invention.

The control head 12 illustrated in FIG. 2 may be small and compact, but nevertheless includes all of the necessary switching as an interface for the computer 10 in a worldwide VLF navigation system according to the invention. Thus, the control head 12 includes a master on-off switch 16, which is a locking switch so that it cannot be inadvertently switched off and thereby inadvertently lose RAM (randome access memory) information stored in the computer 10 as a part of a particular navigational sequence.

A keyboard 18 on the control head 12 operates a switch matrix for entering data to the computer 10. When function selector switch 22 is in an enter data position, the enter data indicator light 20 flashes.

The function switch 22 also controls a switch matrix, and includes a series of positions for the selective entry of particular data, as well as a further series of positions designating en-route information desired by the operator to be displayed on the display or readout unit 14. When the function selector switch 22 is in one of the positions indicating en-route information, the en-route indicator light 24 is on.

The present navigation system is a dead reckoning type of navigation system with intermittent position fixing. The system requires the entry of initial position coordinates and time, and this initial positioning can be upgraded whenever the aircraft bearing the equipment passes over any known landmark. Then, based upon such initial coordinates and time, or upgraded coordinates and time, the system constantly determines $\Delta$ coordinates from the initial or upgraded fix and thereby provides updated information to be displayed on the display unit 14 at the operator's discretion relating to position, left/right guidance information to destination or a waypoint, heading and distance to a waypoint or destination, ground speed, and time for arrival at destination or a waypoint.

Prior to start, the control head 12 is placed in the "enter data" mode by actuation of the function switch 22, and keyboard 18 is suitably actuated to enter the starting data. Thus, the function switch will be placed in the "start longitude" position, and the initial longitude will be entered into the computer by suitable actuation of the keyboard 18. The function switch 22 will then be placed in the "start latitude" position and the initial latitude will be entered by means of keyboard 18. Function switch 22 will be selectively positioned at the "date" and "Greenwich Mean Time" positions, and this informmation will likewise be selectively entered by means of keyboard 18. The coordinates of the destination will also be entered during this enter data mode, the function switch 22 being placed in the "destination longitude" position and the entry thereof being made through keyboard 18, and the function switch 22 being positioned in the "destination latitude" position and this information being entered through keyboard 18. During entry of the destination coordinates "waypoint" switch 26 is placed in position 5. In addition to such destination coordinates, up to four sets of waypoint coordinates may also be entered during this enter data mode by positioning a waypoint switch 26 in selected waypoint positions 1 through 4 and utilizing the keyboard 18 to enter the destination longitude and destination latitude coordinates of the respective waypoints.

Thus, the programming of the system is easily accomplished by placing the system in the enter data mode; and then, with the use of the keyboard 18 and function switch 22, simply "keying in" present position in longitude and latitude, the date and time, and destination, with desired waypoints.

Figure 3:
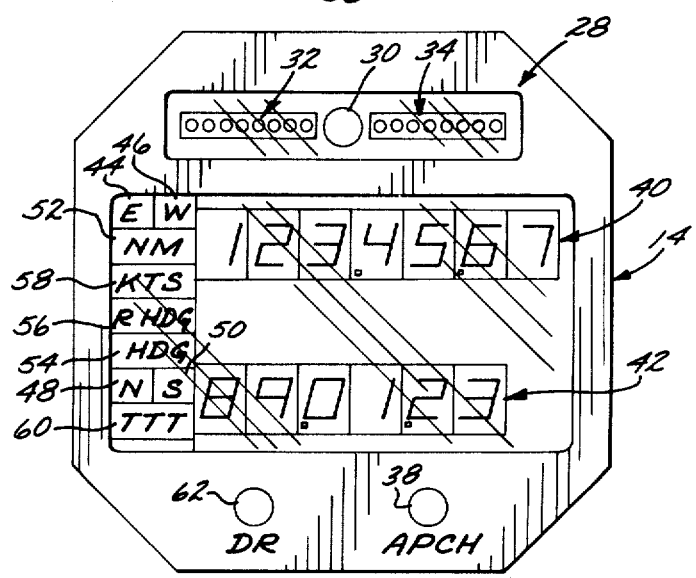
FIG. 3 is a plan view of a display or readout unit also suitable for an airborne navigation system according to the invention, and particularly adapted for use in connection with the functions designated in the control head illustrated in FIG. 2.

Referring now to FIG. 3, the display or readout unit 14 includes a left/right guidance display 28 which provides left-right course deviation information to destination or to a waypoint. The display 28 illustrated in FIG. 3 is a digital type of display suitable for making direct use of the digital course deviation information provided by the computer. If preferred, this information may be transformed into analog information for a conventional meter-type indicator. The left/right guidance display 28 has a central, large window 30 indicating on course. A series 32 of spaced dots to the left of the central window 30 selectively illuminate to indicate the distance to the left of track to the destination or waypoint. Similarly, a series 34 of spaced dots to the right of central window 30 selectively illuminate to indicate the distance to the right of track to the destination or waypoint. With this arrangement, the dots of the left/right guidance display 28 are "flown" like a VOR needle; if one of the dots to the left of center is illuminated, the aircraft must be steered to the left to correct for the deviation; while if one of the dots to the right of center is illuminated, the aircraft must be steered to the right to correct deviation.

The left-right guidance display 28 will be in continuous operation during the "en-route" mode, and will indicate left/right positioning relative to the track to the final destination, unless one of the waypoints is selected by the waypoint selector switch 26, in which case the left/right indication will be for that waypoint. Typically, the series of waypoints will be selectively dialed in by the waypoint selector switch 26, and the left/right guidance display 28 will then apply to each waypoint in turn, and then to the final destination.

For normal en-route operation, each dot in the display 28 indicates a certain increment of distance off course. For example, each of the dots in the display 28 may normally indicate a 1200 foot increment off course. As an example of this, if the third dot to the left of the central window 30 is illuminated in the series 32, with the increment being 1200 feet per dot, this would indicate that the track to the destination or waypoint is approximately 3600 feet to the left of the present course. However, the accuracy of the present system is suitable for use in an approach mode, wherein a more refined left/right readout is desirable. Accordingly, an approach switch 36 is provided on the control head 12, and actuation thereof provides a different order of magnitude for the digital readout on the left/right guidance display 28, as for example 120 feet per dot for the series 32 and 34 of spaced dots. When the approach switch 36 is actuated on the control head 12, an approach mode light 38 will be illuminated on the display unit 14 to indicate the order of magnitude of the increments indicated by the dots in the display 28.

The display or readout unit 14 also includes a pair of digital display-type readouts 40 and 42, which are driven by shift register type decoders that are responsive to serial pulse data from the computer. The readout 40 has a sevensegment digital display, the seven digits being required to display longitude information in degrees, minutes, and hundredths of a minute (or seconds if desired). On the other hand, a six-digit digital display is sufficient for the decoder 42, which is used to display latitude information in degrees, minutes, and hundredths of a minute (or seconds if desired).

In the en-route mode, with the function switch 22 in the longitude-latitude position, the readout 40 will display present longitude, and readout 42 will display present latitude. This information will be constantly upgraded by the computer approximately once per second or faster. Associated with the readout 40 are east and west lights 44 and 46, respectively, which will illuminate according to whether the longitude reading is east or west. Similarly, associated with the readout 42 are north and south lights 48 and 50, respectively, which will illuminate according to whether the readout 42 is north latitude or south latitude.

In the en-route mode, with the function switch 22 turned to the distance-heading position, the readout 40 will have a readout in nautical miles to destination, or to a waypoint indicated by waypoint switch 26, and the readout 42 will have a readout in true heading to destination or such waypoint. These readouts for readouts 40 and 42 will be respectively indicated by "nautical mile" and "heading" lights 52 and 54.

In the en-route mode, with the function switch 22 in the distance-reciprocal heading position, the readout 40 will likewise give the distance in nautical miles to destination or a selected waypoint, as indicated by the light 52; while the readout 42 will indicate the reciprocal heading to destination or such waypoint, as indicated by a reciprocal heading light 56.

In the final position of function switch 22, which is the speed-time to target (or touchdown) position, the readout 40 will display the present groundspeed in knots, as indicated by the light 58; while the readout 42 will display the remaining time to touchdown at the destination, or time to a selected waypoint, in hours, minutes, and seconds, as indicated by illumination of the "time to target" light 60.

Accordingly, in the en-route mode, at the operator's discretion navigational information is constantly updated and displayed which includes left/right guidance information to waypoint or destination, which may be in a refined approach mode if desired; longitude and latitude of present position; distance and heading to waypoint or destination; distance and reciprocal heading to waypoint or destination; and groundspeed and time to waypoint or touchdown at destination.

In the event that sufficient station receivers at any time fail to be "locked" onto respective VLF station signals, it is assumed that present course and speed will be maintained, and on such basis the same navigational information will be updated and displayed on the display unit by the computer according to the position of the function switch 22. In this case, a "dead reckoning" light 62 will illuminate on the display unit 14 to indicate that insufficient VLF stations are presently in acquisition for the normal navigation mode.

Figure 4:
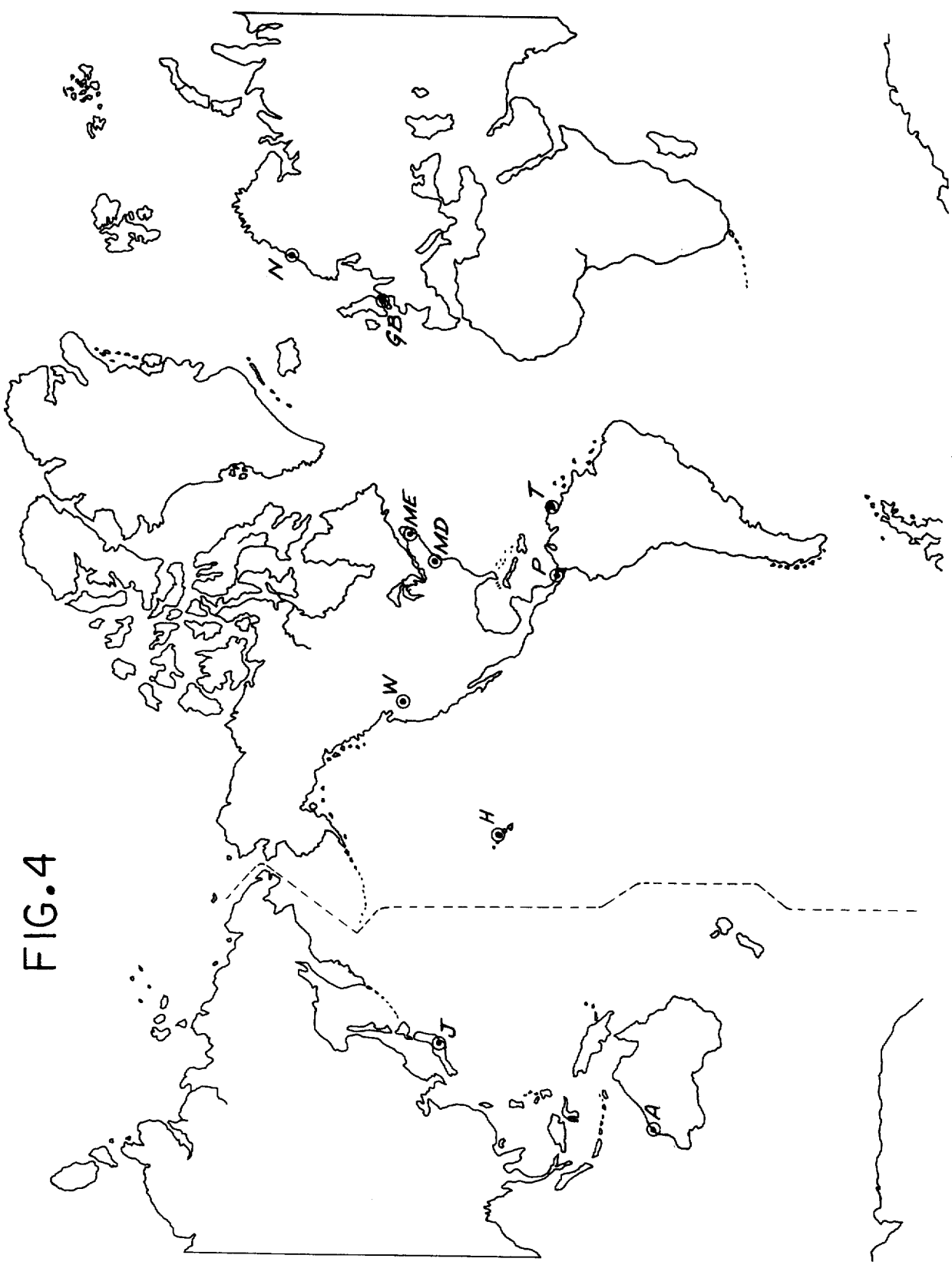
FIG. 4 is a world map, in Mercator projection, indicating some currently available VLF transmitting stations suitable for use with the present invention.

Referring now to FIGS. 4 and 5 of the drawings, ten currently available VLF transmitting stations suitable for the present system are indicated on the world map of FIG. 4, with details thereof set forth in the chart of FIG. 5. The VLF frequency range is generally considered to be from 3 KHz to 30 KHz, which represents a wave length range of from about $10^5$ meters to about $10^4$ meters. All of the currently available stations designated in FIGS. 4 and 5 are in the 10 KHz to 25 KHz range, which is therefore the presently preferred VLF range. Nevertheless, any RF station frequency may be utilized in the present system, provided its frequency is very stable. All of the VLF stations indicated in FIGS. 4 and 5 are frequency-controlled by atomic clocks, so as to be stsble to within an accuracy of on the order of about one part in $10^{-11}$. Frequency and hence phase stability of the VLF transmitting signals with this general order of accuracy enables any such VLF transmitting stations to be utilized in the present system even though none of these transmitting stations are synchronized relative to each other. Utilization of a separate receiver in the present system for each such station, and provision of a phase-locked loop in each receiver which accurately locks onto the respective transmitted signal, enables these unsynchronized but accurate transmitted VLF signals to be utilized in the present system for time difference measurements without requirement of special waveforms or pulses. Additionally, the present system embodies in each receiver novel programmable dividers capable of dividing by any integer and not limited to conventional binary counter type division, so that all received VLF frequencies may be reduced to a common operational frequency in the system (e.g., 100 Hz).

Accordingly, the present system is the only VLF navigation system of which the applicants are aware that is capable of utilizing all of the atomic clock controlled VLF transmitting stations.

The ten VLF transmitting stations identified in FIGS. 4 and 5 are sufficient in coverage so that navigation may be accomplished with the present system on a worldwide basis with only these ten stations if desired. Additionally, a sufficient number of these 10 stations can normally be locked onto at any point in the world to permit station averaging so as to increase overall accuracy and to average out any known frequency varying factors such as the diurnal shift.

It is preferred to utilize VLF com (communication) stations because of the CW (continuous wave) signals transmitted thereby. However, intermittent transmitting stations may also be used, such as the Omega stations. If Omega stations are used, it is preferably to utilize Omega timing signals, which are on approximately 60% of the time; the receiver phase-locked loops in the present system being sufficiently stable so that there will not be any appreciable phase shift during the 40% off time.

Eight of the 10 currently available stations designated in FIGS. 4 and 5 are VLF com stations, including Maine, Maryland, Panama, Washington, Hawaii, Australia, Great Britain, and Japan; while two of the designated currently available stations are Omega stations, including Trinidad and Norway.

It is contemplated that two additional stations will be used in equipment according to the invention, and accordingly spaces for two alternate stations are included in the chart of FIG. 5.

THE SYSTEM DESCRIBED IN CONNECTION WITH STATION PAIR SELECTION FOR USE WITH HYPERBOLIC COORDINATES

Figure 6:
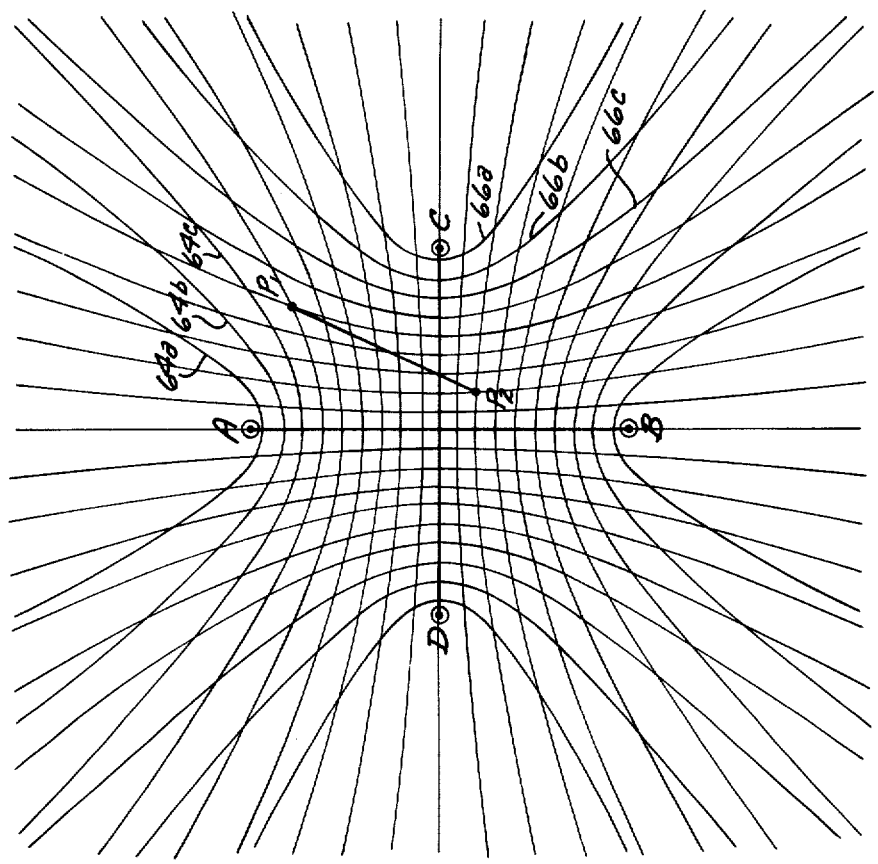
FIG. 6 is a graphical illustration of two independent lines of position and their respective hyperbolic lines of constant time difference for two VLF station pairs that are ideally located relative to each other.

FIG. 6 illustrates two station pairs A,B and C,D which are ideally located to provide a hyperbolic gridwork of the most uniform possible configuration. In this ideal system, axes A—B and C—D are at right angles to each other and of equal length. Hyperbolic lines 64a, 64b, 64c, etc., are lines of constant time difference between the stations A and B; while the hyperbolic lines 66a, 66b, 66c, etc., are lines of constant time difference between the stations C and D. Thus, the two independent lines of position A—B and C—D provides a hyperbolic gridwork from which a time difference of $\Delta T$ will be defined between a start point $P_1$ and a destination or waypoint $P_2$ for each set of hyperbolic lines. Inasmuch as the $\Delta T$ for each set of hyperbolic lines corresponds to a certain distance (one nautical mile corresponds to a $\Delta T$ of approximately 6.8 microseconds) the hyperbolic time coordinates for the destination or waypoint $P_2$ may be determined by time difference information, and accordingly the longitude and latitude coordinates may be determined for the waypoint $P_2$. The direction of the line $P_1 - P_2$ on the hyperbolic coordinates indicates heading to waypoint or destination. The rate of change of $\Delta T$ for each set of hyperbolic coordinates provides groundspeed information.

It will be understood that the station pairs A,B and C,D are all of different frequencies, and are not synchronized or phase locked with each other. They are, however, stabilized by atomic clocks, such as cesium beam clocks, and therefore in fact contain phase information which remains extremely stable relative to each other, and is utilized in the present invention to define the aforesaid $\Delta T$ information. Briefly, this is accomplished in the present system by locking a separate receiver in the system to each of the stations A, B, C, and D, with respective phase-locked loops in the receivers which provide loop signals that are in effect phase coherent with the respective transmitter station signals; and then normalizing all of the receiver loop signals to a common working frequency and thus rendering these working frequency signals for the various receivers phase coherent; i.e., having a steady or fixed phase relationship relative to each other. These phase coherent working signals of common frequency in the receivers then define the $\Delta T$ information for the hyperbolic coordinates of each station pair such a A,B and C,D in a high frequency crystal controlled clock counter.

By this means the hyperbolic lines of position are converted in the present invention to an accurate and meaningful display, which has heretofore been a major problem in the art.

Figure 7:
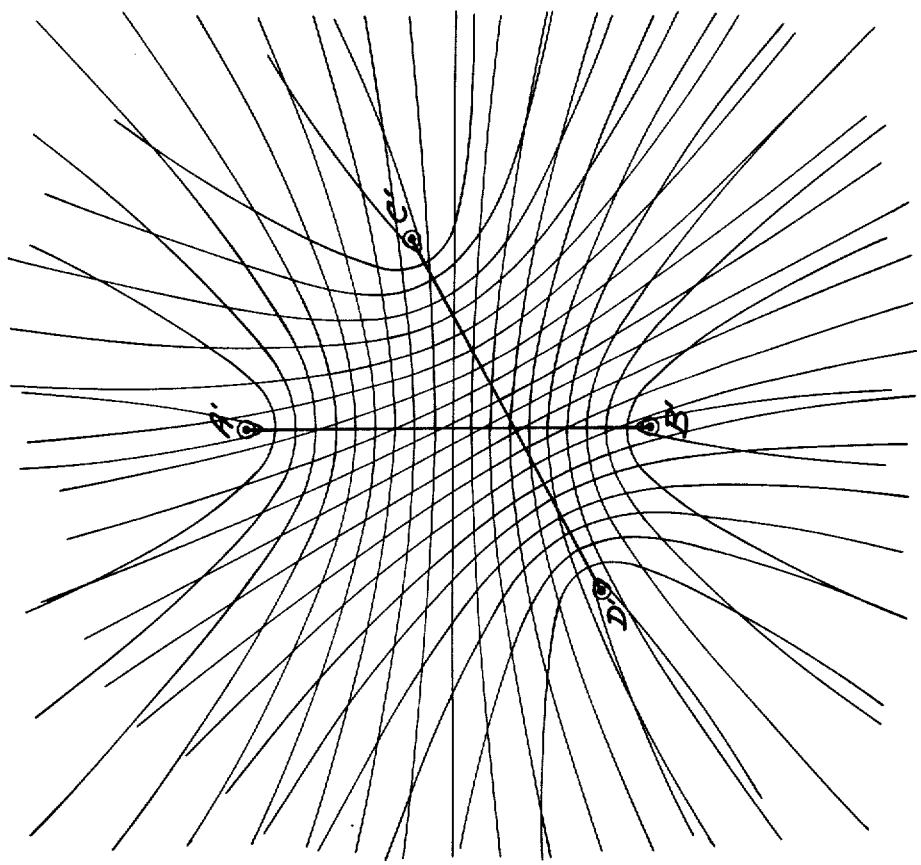
FIG. 7 is a graphical view similar to FIG. 6, but illustrating independent lines of position and respective hyperbolic lines for two station pairs more typically located.

FIG. 7 illustrates the hyperbolic lines of constant time difference, or lines of position, for station pairs A', B' and C', D' which are more typically located. It will be seen that the two station pairs A'B' and C'D' still provide a good gridwork of hyperbolic coordinates with their lines of constant time difference. With both the ideal hyperbolic gridwork of FIG. 6 and the more typical hyperbolic coordinate system of FIG. 7, it will be seen that the best resolution is obtained generally in the central part of the grid. Station pair selection is made on the basis of both good geometry and sufficiently close range for good signal reception. Nevertheless, a station is not selected which is too close, because of the distortion in the hyperbolic lines which occurs close to a station.

Station pair selection is made by the computer, according to a station pair algorithm stored in the computer ROM (read only memory) chips. For this purpose, the range and bearing (heading) to each transmitter is calculated from the present position periodically. Then, based upon the receiver position at any time, the computer software (ROM) sets up the computer to select stations according to acceptable geometry and range conditions. Alternatively, for this purpose the world may be divided into a large number of small zones, as for example 1800 small zones; and a small number of major zones of irregular shape, as for example 48 major zones. Then, based upon the receiver position at any time, the computer software (ROM) sets up the computer to select stations according to the particular area in which this position is located.

The receivers for the respective stations are all arranged to provide a "signal present" acquisition signal to the computer, which is a go or no-go signal indicating whether or not a particular signal is phase-locked onto its respective station.

As an example, assume that for the particular position, the computer software determines that the computer wants to select Trinidad and Washington as a station pair. The computer then goes to the receivers for Trinidad and Washington, and if both have a signal present indication, the computer will utilize this signal pair. However, if it receives a no-go or signal not present from the Trinidad receiver, then the computer will eliminate every Trinidad pair and will proceed to select station pairs utilizing other stations.

Figure 8:
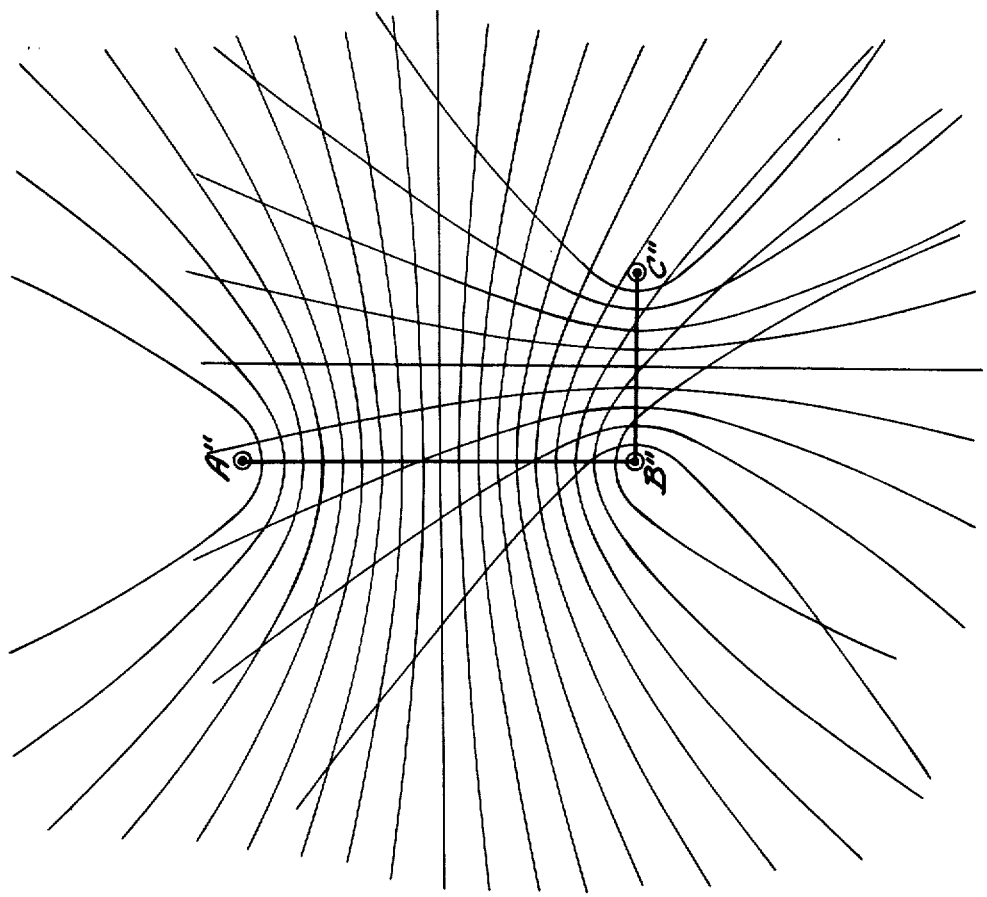
FIG. 8 is a graphical view similar to FIGS. 6 and 7, but illustrating two independent lines of position and respective hyperbolical lines of constant time difference for the minimum of three VLF transmitting stations.

Assuming that there are N stations available to the computer at a particular position (i.e., N stations giving a go or signal present indication from their respective receivers), then the number of unique station pairs available to the computer is N-1. In other words, there are N-1 independent lines of position available from N stations. Since the minimum number of independent lines of position required for navigation is two, then the minimum number of stations required for navigation is three. FIG. 8 illustrates VLF hyperbolic lines of constant time difference for three stations A'', B'' and C'', in an example of typical three-station geometry.

However, with the 10 presently available VLF stations indicated on FIGS. 4 and 5, normally six unique station pairs will be available for navigation at any point around the world. Accordingly, several station pairs may be generated by the computer in the station pair selection routines for each designated position or zone around the world, and it is contemplated that the six best pairs of these several pairs will be utilized by the computer, other pairs being alternates that may be used by the computer if one or two of the other pairs are not locked onto by their respective receivers. The computer station pair selection routines are to be arranged for selection of the best station pair geometry, as well as range.

The presently contemplated use of six station pairs for determining a position enables three independent determinations of positions to be made, since it requires only two station pairs for one position determination.

Statistically, if the errors in these three separate position determinations are truly random errors, and if the accuracy of each determination is to within $\Delta$ position, then averaging of the three positions can improve $\Delta$ by $1/\sqrt{3}$.

The mode of operation for station pair averaging in the computer is as follows: The computer takes a first station pair, determines the latitude and longtitude therefrom, and stores this information. The computer then does the same for a second station pair, and then it does the same for a third station pair. Thus, the computer now has stored three independent positions of longitude and latitude. It adds the three longitude positions and divides by three, and adds the three latitude positions and divides by three, to determine an average longitude position and an average latitude position. The computer is programmed to reject any data outside of a reasonable average. Thus, for example, if data from one station pair should be caused by some interference or other factor to be considerably outside of a reasonable average, then such data is rejected, and the computer will then select one of the alternate station pairs, and the new group of three station pairs will again be averaged, and will be accepted if all data is within a reasonable average.

It will be understood that the ten VLF transmitting stations referred to in FIGS. 4 and 5 of the drawings are presently available stations, and that other and perhaps better stations will probably be established, and that perhaps some of these presently available stations will terminate. Accordingly, it is preferred to employ a separate ROM chip in the computer for each separate station, and to arrange these station ROM chips to be replaceable so as to take into account such contemplated station changes.

Figure 9:
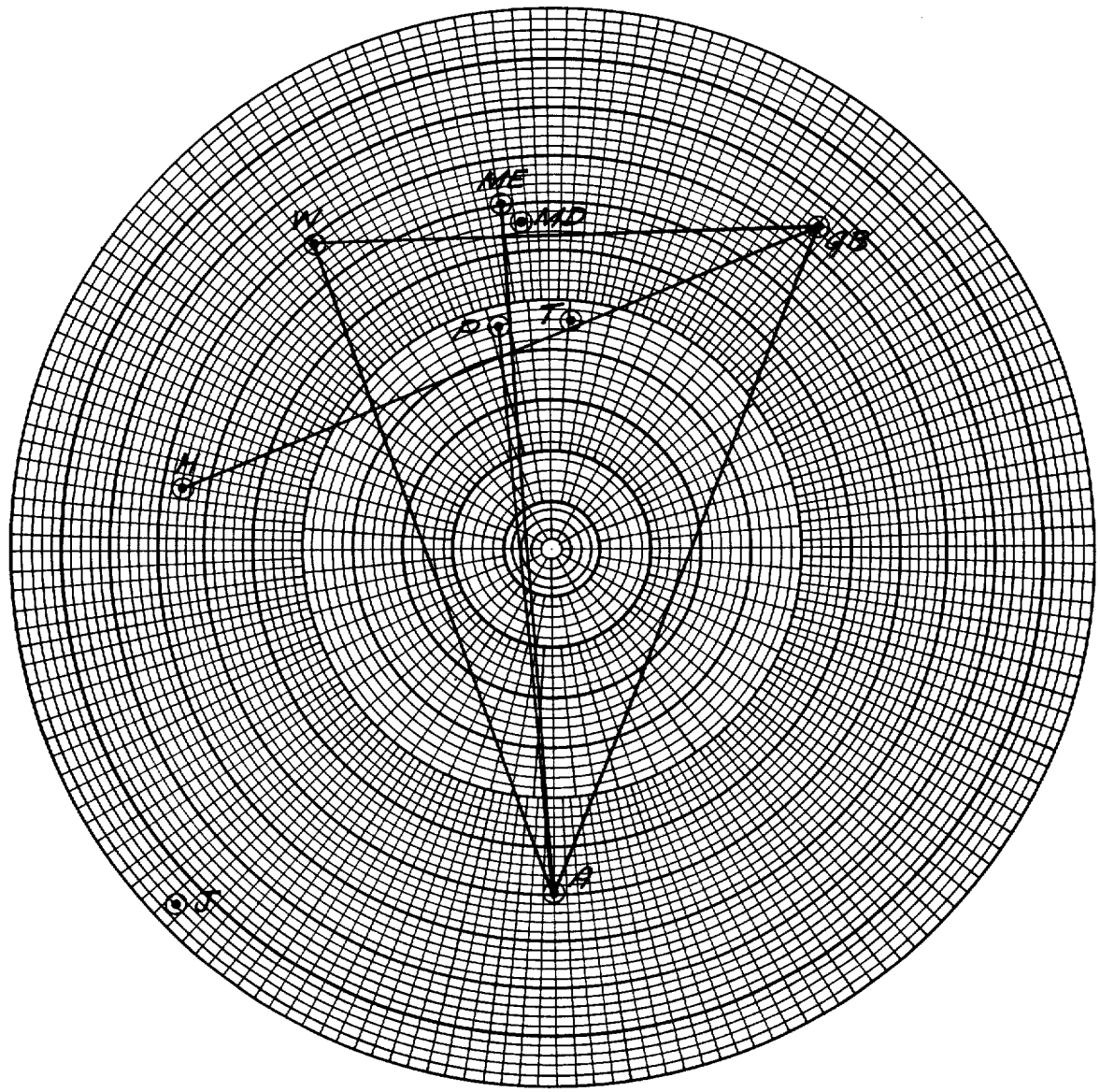
FIG. 9 is a polar plot illustrating VLF transmitting station pairs available for navigation with the present system with a present position at the tip of Argentina.

FIG. 9 is a polar plot, with north at the top of the page, and present position at the pole or center, which is at the tip of Argentina, with a longitude of 66.97 and a latitude of 56.99. The radial distance between adjacent concentric circles on the plot is 1,000 nautical miles. Eight usable station pairs from the aforesaid currently available stations are indicated below the plot. For this position, the computer is programmed to make three independent position calculations from (1) the two station pairs Hawaii-Great Britain and Maine-Australia; (2) the two station pairs Great Britain-Australia and Australia-Washington; and (3) the two station pairs Great Britain-Washington and Panama-Australia. Alternate station pairs programmed to be selected by the computer in the event of either a no-go from a receiver in one of the preferred selected station pairs or in the event data is rejected as being outside of a reasonable average of the three independent sets of data, are Panama-Hawaii, and Hawaii-Australia. The geometry for all of the selected station pairs is good.

While Trinidad is well located as to geometry, it is not at present sufficiently powerful for reliable reception beyond about 4,000 miles, and since it is approximately 4,600 miles from present position, it is not included in the station pairs. The stations are thus picked both for geometry and for range. In this regard, it is to be noted that Japan is located approximately 10,600 miles from the present position, and is likewise not one of the selected stations.

FIG. 10 is a polar plot similar to FIG. 9, but with less detail. The plot in FIG. 10 also has north at the top of the page, and is for a present position at southwest Ontario, Canada, having a longitude of 94.88 and a latitude of 47.21. For the zone in which this position is located, the computer is programmed to make the three position determinations for averaging based upon (1) the two independent lines of position provided by Panama-Japan and Hawaii-Great Britain; (2) the two independent lines of position provided by Japan-Trinidad and Panama-Great Britain; and (3) the two independent lines of position provided by Washington-Maine and Panama-Washington. Alternate station pairs or independent lines of position are Hawaii-Maine and Trinidad-Washington.

It will be noted from the plot of FIG. 10 that the closest stations to the present position (at the center of the plot), Washington and Maryland, are approximately 1,000 miles away. While stations considerably closer than this can normally be employed, it will be apparent from the typical examples of station geometry set forth in FIGS. 7 and 8 that if the range to a station is too close, the hyperbolic grid geometry tends to become considerably distorted for stations substantially offset from the station pair line. Accordingly, the computer is programmed to not use stations that are so close as to cause such distortion, which tends to introduce errors in the calculations.

On the other hand, for strong transmitting stations ranges up to about 10,000 nautical miles may be satisfactory. With the currently available stations indicated on FIG. 4 and 5, the desired station pairs involve stations within 10,000 miles for most navigational zones throughout the world.

FIG. 11 is a polar plot similar to FIGS. 9 and 10 for a present position in southwest British Columbia, Canada, with a W longitude of 129.25 and an N latitude of 47.21. In this case first position data is obtained from the two station pairs Australia-Trinidad and Great Britain-Hawaii; second position data is obtained from the two station pairs Japan-Panama and Hawaii-Maryland; and third position data is obtained from the two station pairs Hawaii-Trinidad and Hawaii-Japan. Alternate station pairs are Australia-Maine and Maine-Hawaii.

THE OVERALL SYSTEM

Figure 12:
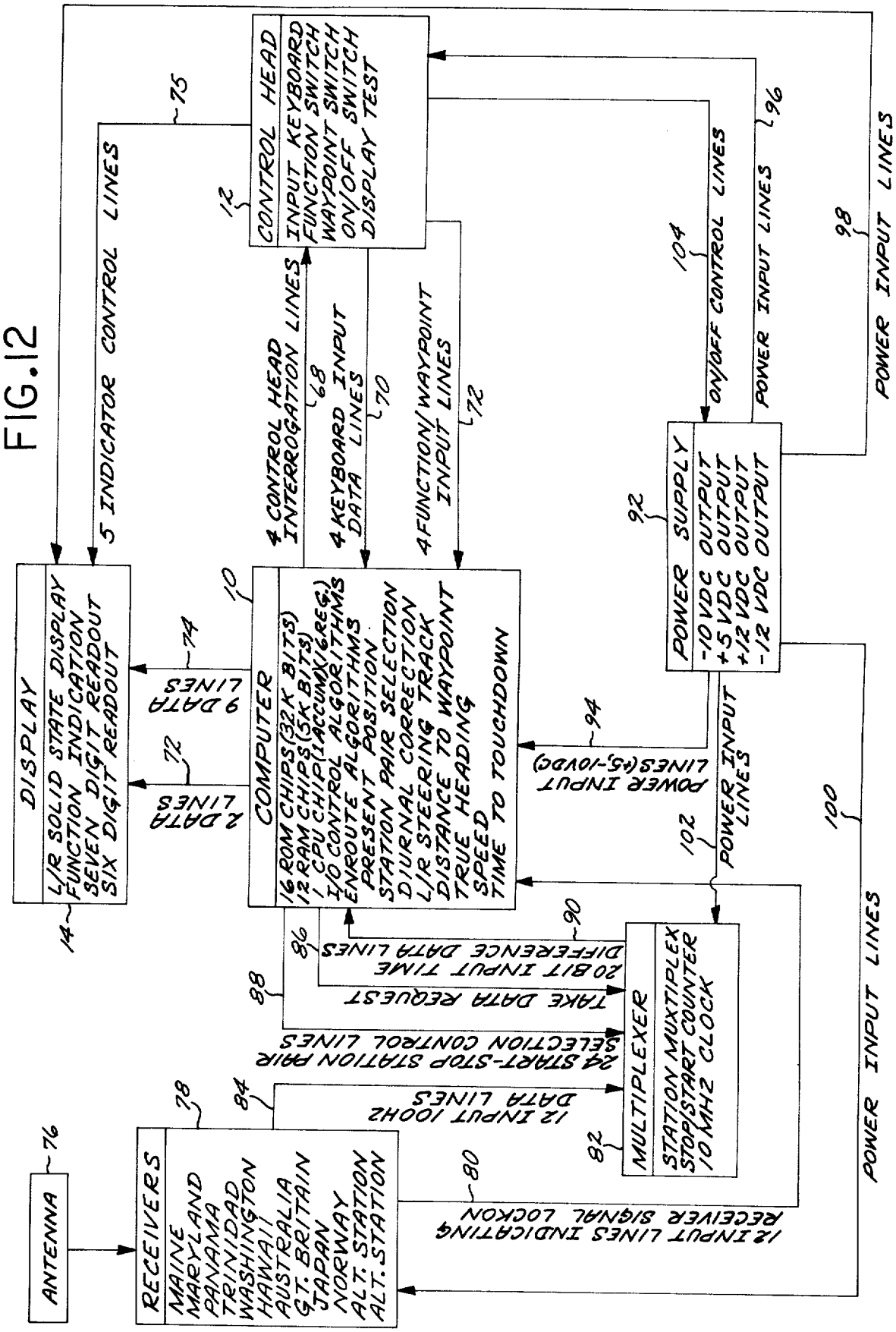
FIG. 12 is an overall block diagram of the mobile or airborne portion of the present navigation system.

FIG. 12 is a block diagram of an overall mobile or airborne system embodying the principles of the present invention, which is adapted for navigation utilizing VLF stations like those heretofore referred to on a worldwide basis.

The computer 10, which is the heart of the system, is preferably a miniaturized type computer suitably compact for convenient placement and for use in small aircraft. Such computer, and the required chips therefor, are currently available from Intel Corporation, of 3065 Bowers Avenue, Santa Clara, California 95051. A suitable computer 10 to accommodate 12 contemplated stations, and hence 12 separate receivers, may include 16 ROM (read only memory) chips of 1,024 bits each; 16 RAM (random access memory) chips of 320 bits each; and one CPU (central processor) chip including one accummulator and 16 registers. While the various computer algorithms will be described in more detail in a later section, they briefly include input and output control algorithms; and en-route algorithms including present position, station pair selection, diurnal correction, left/right steering track, distance to waypoint, true heading, speed, and time to touchdown or waypoint.

The control head 12, which is the interface between operator and computer, includes (as best shown in FIG. 2) the input keyboard 18, function switch 22, waypoint 26, on/off switch 16, and a display test switch forming part of the keyboard 18. Control head 12 has connection 68 with the computer which includes four control head interrogation lines that are scan lines from the computer; connection 70 consisting of four keyboard input data lines to the computer; and connection 72 consisting of four function/waypoint input lines to the computer.

The display unit 14, shown in detail in FIG. 3, includes the left/right guidance course display 28, the seven-digit readout 40, the six-digit readout 42, and the various function indication lights 38, 44, 46, 48, 50, 52, 54, 56, 58, 60, and 62. The display unit 14 has a connection 72 with the computer including two data lines for the left/right digital display; and a connection 74 with the computer including nine data lines for the readouts 40 and 42. Function indication is provided to the display unit 14 through connection 75 from control head 12, consisting of five indicator control lines.

Signal input from all stations into the system is through a single antenna generally designated 76, which consists of a voltage probe-type antenna and a broadband preamplifier housed in or near the antenna base. The signals from the antenna 76 are fed to all of the 12 receivers, which are tuned to their respective stations, the receivers as a group being designated 78. Connection 80 from the receivers 78 to the computer 10 includess twelve input lines to the computer, one for each receiver, indicating receiver signal lock-on. Time data from the receivers 78 is provided to the computer 10 through a multiplexer 82; connection 84 from receivers 78 to multiplexer 82 including twelve input data lines (one for each receiver) for the "normalized" receiver data output frequency (e.g., 100Hz). The multiplexer 82 includes multiplex logic, a high frequency crystal controlled clock (e.g., 10 MHz), and a stop/start counter for counting the clock pulses. Connection 86 from the computer 10 to multiplexer 82 is a take data request line. Connection 88 from computer 10 to multiplexer 82 includes 24 start/stop station pair selection control lines. Connection 90 from multiplexer 82 to computer 10 includes 20 bit input time difference data lines which are from the start/stop counter (a binary coded decimal counter) of the multiplexer.

Power supply 92 is connected to computer 10 through power input lines 94; to control head 12 through power input lines 96; to display unit 14 through power input lines 98; to receivers 78 through power input lines 100; and to multiplexer 82 through power input lines 102. Connection 104 between control head 12 and power supply 92 includes on/off control lines associated with the on/off master switch 16 of the control head, whereby the master switch 16 enables or disables power from the power supply 92 to all components of the apparatus through the various power input lines 94, 96, 98, 100, and 102.

INPUT PORTION OF THE SYSTEM

Figure 13:
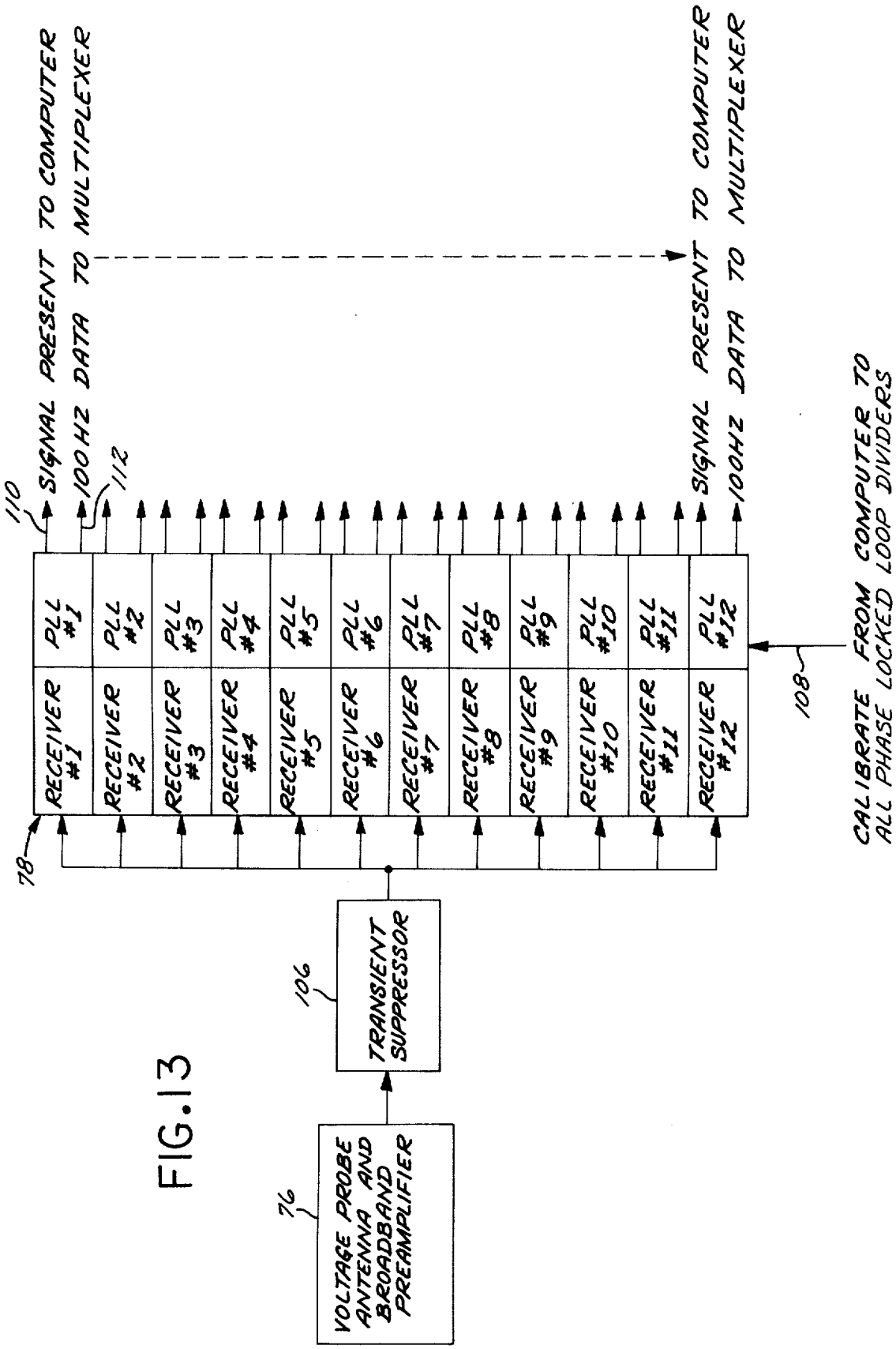
FIG. 13 is a general block diagram of an input portion of the system from antenna through receivers, the embodiment illustrated in FIG. 13 having 12 receivers adapted to receive and lock onto VLF signals from 12 respective transmitting stations.

FIG. 13 is a general diagram of the input portion of the system from the antenna generally designated 76 through the receivers generally designated 78. The antenna 76 comprises a voltage probe antenna, and housed proximate the base structure thereof is a broadband preamplifier. The VLF signals from all stations in receiving range are received by the antenna 76 and amplified by the broadband preamplifier housed therewith, and are then passed through a transient suppressor generally designated 106, and are fed in parallel to all of the receivers in the group 78 of receivers. Since it is contemplated that VLF signals will be utilized from twelve separate transmitting stations throughout the world, 12 receivers are illustrated in this parallel array in FIG. 13, being designated receiver No. 1, receiver No. 2, ... receiver No. 12.

Each of the separate receivers numbers 1 to 12 includes as a part thereof its own phase-locked loop, sometimes referred to herein as "PLL"; and accordingly, PLLs numbers 1, 2, ... 12 are illustrated in FIG. 13 associated with their respective receivers numbers 1, 2, ... 12. A calibrate line 108 from the computer is connected to all of the PLLs, in a parallel connection arrangement, to provide a common "calibrate" signal from the computer to all of the PLLs so as to calibrate all of the normalized (e.g., 100 Hz), phase coherent data signals from the PLLs to a phase synchronous relationship.

Each PLL has a "signal present" line 110 to the computer. Each PLL also has a "normalized data" line 112 to the multiplexer 82, these data lines 112 being included in the connection 84 designated in FIG. 12.

Figure 14:
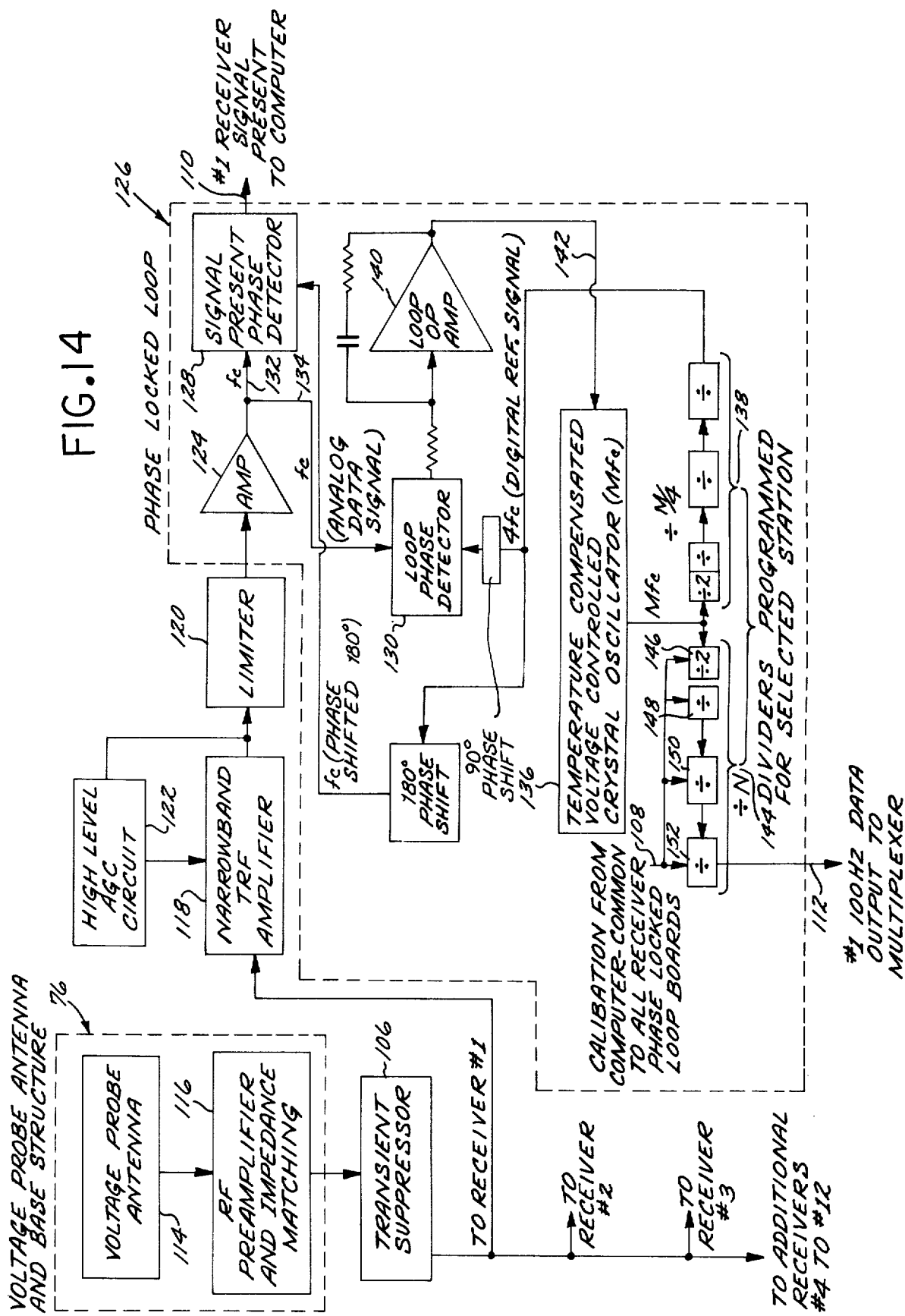
FIG. 14 is a block diagram of input elements of the present system, including a complete block diagram of one of the receivers.

Reference will now be made to FIG. 14, which includes a complete block diagram of one of the receivers, and which also discloses the relationship of input elements thereto. In FIG. 14 the antenna means 76 heretofore disclosed as a single block in FIGS. 12 and 13 is broken down into separate units including voltage probe antenna 114 and RF preamplifier 116, which is a broadband preamplifier and includes impedance matching circuitry. As indicated hereinabove, the preamplifier 116 is preferably housed within the base of the antenna structure of antenna 114. For the presently preferred VLF range of about 10 KHz to about 25 KHz, the broadband preamplifier will preferably have a bandpass of from about 7 KHz to about 40 KHz. This is sufficiently wide to allow the frequencies of interest to pass with negligible phase shift.

Optimum signal is obtained by physically locating the preamplifier 116 proximate the antenna 114. This is because antenna impedance at these VLF frequencies is so high that any stray capacitances due to cable would tend to severely degrade the signal.

Output of the preamplifier 116 is fed through a cable to a common equipment housing (not shown) and in particular to the transient suppressor 106 therein. This common equipment housing contains not only the transient suppressor 106 but all of the receivers 78, the computer 10, the multiplexer 82, and the power supply 92.

The transient suppressor 106 is employed because signals in this VLF frequency spectrum have high level transients due to atmospheric conditions, including lightning and other atmospheric effects, as well as local disturbances such as 60 Hz harmonics. The transient suppressor 106 clips such transients at a prescribed level, and thereby keeps these disturbances from disrupting the circuitry in the remainder of the system, and in particular removes high level transients which would cause distortion in the RF signal such as would make "lock-on" in any of the receiver phase-locked loops difficult to achieve.

Circuit details of a suitable broadband RF preamplifier 116 and of a suitable transient suppressor 106 are shown in FIGS. 15 and 16, respectively, and described in connection therewith.

The output of transient suppressor 106 is fed in parallel to the inputs of all of the receivers, including the input element of the complete receiver, designated receiver No. 1, illustrated in FIG. 14. This input element is a narrowband TRF (tuned radio frequency) amplifier designated 118. This narrowband TRF amplifier 118 is tuned to the respective VLF transmitted frequency, and the output thereof is processed through a limiter 120. A high level AGC (automatic gain control) circuit 122 is associated with the narrowband amplifier 118 to prevent overloading. The output of limiter 120 is then fed to an amplifier 124 which is the input element of the phase-locked loop which is generally designated 126.

Figure 17:
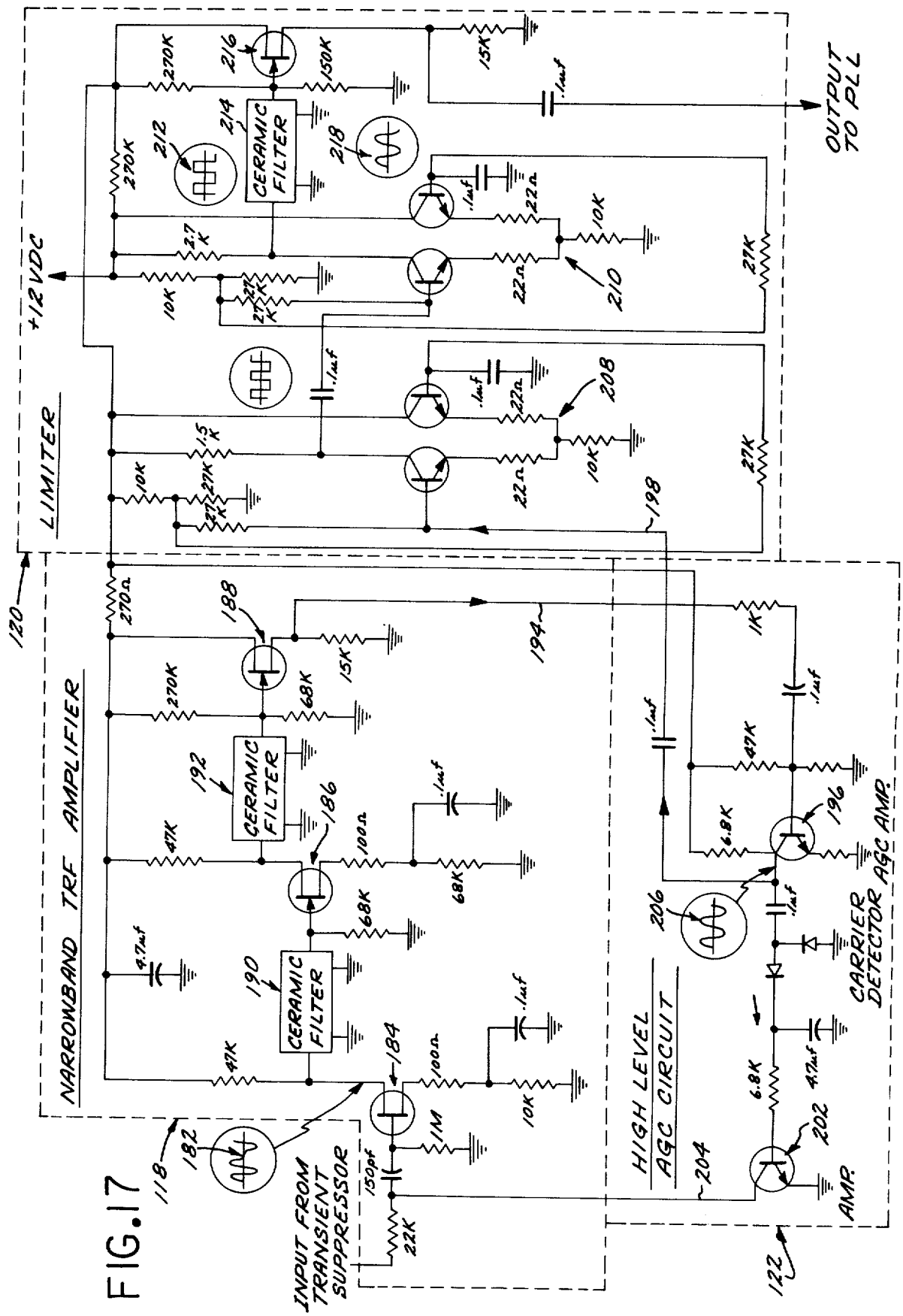
FIG. 17 is a circuit diagram illustrating narrowband TRF amplifier, limiter, and high level AGC circuits employed in a particular receiver.

Suitable detailed circuitry for the narrowband TRF amplifier 118, limiter 120, and high level AGC circuit 122 is shown in FIG. 17 of the drawings.

RECEIVER PHASE-LOCKED LOOP

The particular VLF station frequency isolated in the receiver of FIG. 14 is designated in that figure as $F_c$. The $F_c$ output of amplifier 124 may be considered to be the analog (sine wave) data signal for the phase-locked loop 126. This $F_c$ analog data signal is fed simultaneously to two phase detectors, a signal present phase detector 128, and a PLL phase detector 130. The connection from amplifier 124 to signal present phase detector 128 is designated 132, while the connection from amplifier 124 to the loop phase detector 130 is designated 134.

A digital reference signal is provided for the two phase detectors 128 and 130 by means of a temperature compensated voltage controlled crystal oscillator 136 sometimes hereinafter referred to as a TCVCXO, or simply as a VCO. The TCVCXO 136 is selected to have a preferred frequency in the range of from about 4 MHz to about 5 MHz, wherein such oscillators are available having a high degree of frequency stability. The actual frequency selected for the TCVCXO 136 is a multiple of the analog data signal frequency $F_c$, and the multiplication factor "M" from the analog signal frequency $F_c$ to the TCVCXO frequency that is in the approximately 4 MHz to 5 MHz range is preferably a factor that is divisible by four for phase shifting purposes as will become more apparent hereinafter. Thus, the digital reference signal provided by the TCVCXO 136 equals $Mf_c$.

By having the voltage controlled oscillator 136 in the preferred frequency range of about 4 MHz to about 5 MHz, and having it a temperature compensated crystal oscillator in addition to being voltage controlled, it can be held to an accuracy of within a couple of parts per million. This produces phase-locked loop lockup times generally on the order of between about 10 and 30 seconds, and frequently in much less time than that, as compared with lockup times for other VLF systems generally on the order of from about 5 to about 15 minutes, and sometimes with no lockup at all under extreme temperature conditions. This very stable phase-locked loop condition provided by the TCVCXO 136 also enables the phase-locked loop to stay extremely close to an Omega station frequency during the off time of the Omega signal, so that when the Omega signal comes back on the phase-locked loop it is in effect already in acquisition thereof.

The $Mf_c$ signal from the VCO 136 is fed through a first programmable divider 138, which divides the $Mf_c$ digital reference signal by M/4 so as to produce a further digital reference signal having a frequency of $4f_c$. This $4f_c$ digital reference signal is fed to the loop phase detector 130, being divided by 4 and phase shifted so as to be advanced 90°.

The loop phase detector 130 compares its analog data signal input from connection 134 with this digital reference signal input now also of frequency $F_c$ but advanced in phase 90°, and the output of loop phase detector 130 is fed to a loop operational amplifier 140, the output of which is coupled through connection 142 back to the TCVCXO.

There will be no output of the loop operational amplifier 140 if the analog data signal and digital reference signal to the loop phase detector 130 are in exact quadrature (phase shifted exactly 90°). However, if the analog data signal leads the digital reference signal relative to this quadrature relationship, there will be a plus voltage output of the loop operational amplifier 140; while if the analog data signal lags the digital reference signal relative to this quadrature relationship, the loop operational amplifier will provide a negative voltage output. Such voltage outputs of the loop operational amplifier 140 coupled to the TCVCXO 136 through connection 142 correct the digital reference signal phase until the analog data signal and the digital reference signal are "locked" in exact quadrature.

This phase-locked loop 126 will lock to approximately 1° of accuracy referenced to a full cycle of the VLF signal being received, which has a frequency $F_c$. For example, if $F_c$ is 12 Kc., then one full cycle is approximately 16 miles, and 1° is 1/360 of this or approximately 235 feet, which is therefore the approximate order of accuracy of the phase-locked loop 136. However, this is a completely random error and it is averaged in the present system so as to become negligible. Such averaging is provided for velocity readings in the present system by providing a suitable time window within which the phase-locked loop fluctuation will average out to substantially zero.

A second programmable divider 144 is also connected to the TCVCXO 136 so as to receive the digital reference signal of $Mf_c$ therefrom. The divider 144 divides the $Mf_c$ digital reference signal by a factor N to produce a square wave output at line 122 (leading to the multiplexer) which is the normalized or common working frequency for all of the receivers. The presently preferred normalized or working frequency is 100 Hz, which will be assumed to be the normalized or working frequency unless otherwise stated. Thus, for the normalized frequency of 100 Hz, the dividing factor equals $Mf_c/100$ Hz. This equation can be otherwise stated as $Mf_c/N = 100$ Hz, or $F_c = N/M \times 100$ Hz.

Accordingly, M and N can always be selected in this system to produce the exact 100 Hz normalized data signal regardless of station frequency $F_c$. This requires, however, that at least one of the programmable dividers (generally the second or N divider 144), and preferably both of the programmable dividers 138 and 144, be capable of dividing by any integer. This is contrary to conventional practice in VLF navigation systems, wherein division is by means of a binary counter (i.e., by 2, 4, 8, 16 ... 256, etc.) and navigation is limited to use of only a few VLF stations having frequencies suitable for use in connection with such binary division.

Assume, for example that the VLF station frequency is 10,464 Hz. Then $10,464 = N/M \times 100$, so $N/M = 10464, 20928$, etc. Thus, the normalized 100 Hz data output from the second programmable divider 144 is readily achieved in the present invention by utilization of programmable dividers capable of dividing by any integer. Such programmable dividers are described in further detail hereinafter in connection with FIG. 18 of the drawings.

It will thus be seen that for any transmitter station VLF frequency, including all of the currently available station frequencies as set forth in the chart of FIG. 5, a TCVCXO frequency can be selected, with reference to the multiplication factor M of the station frequency, and the dividing factor N, so as to produce the desired normalized data signal frequency such as 100 Hz or other desired working frequency.

These normalized (e.g., 100 Hz), phase coherent data signals for all of the receivers are calibrated by being started exactly simultaneously by the single calibration signal provided from the computer through the "calibrate" line 108. This is accomplished by having the calibrate signal applied simultaneously to all elements of the normalizing programmable divider 144 in all of the receivers. This is indicated in FIG. 14 by direct connection of the calibrate line 108 to each of the four elements 146, 148, 150, and 152 of the second programmable divider 144. Thus, even though these divider elements 146, 148, 150, and 152 are series or sequentially arranged for their dividing operation, nevertheless, the calibration signal from the computer is simultaneously applied to all of them. This results in the normalized 100 Hz (or other frequency) data signals of all of the receivers being phase synchronous for determining $\Delta T$ and hence $\Delta$ longitude and $\Delta$ latitude information in the hyperbolic coordinates of various station pairs.

While 100 Hz is the presently preferred normalized or working frequency for the data signals provided by the receivers to the multiplexer by the data lines 112, it is to be understood that other working frequencies can be employed, if desired, within the scope of the invention. For example, if a working frequency of 50 Hz is selected for the phase coherent data signals of the receivers, then the distance range of the system will be doubled without ambiguity, but the time, and hence distance information cannot be sampled as rapidly by the computer, and the resolution is halved. As a further example, if the working frequency is reduced to 10 Hz, the sampling is spaced considerably farther apart, but an even longer range is provided without ambiguity.

On the other end of the spectrum, if the working frequency is increased above 100 Hz, the resolution is also increased, but the range without ambiguity is shorter.

The practical range of frequencies for the normalized receiver data signals is presently considered to be from about 10 Hz to about 1,000 Hz. With the preferred normalized frequency of 100 Hz, ½ wavelength is about 820 nautical miles, and ¼ wavelength is about 410 nautical miles. For ambiguity purposes, the computer will recalibrate the receivers to the phase coherent condition approximately every 400 nautical miles, or within ¼ wavelength. In this manner, there can be a full ¼ wavelength movement in either a forward (plus) or rearward (minus) direction without ambiguity. The 100 Hz data signals will, of course, be calibrated to coherent condition at the start point also, and at any new coordinate entry point.

Figure 18:
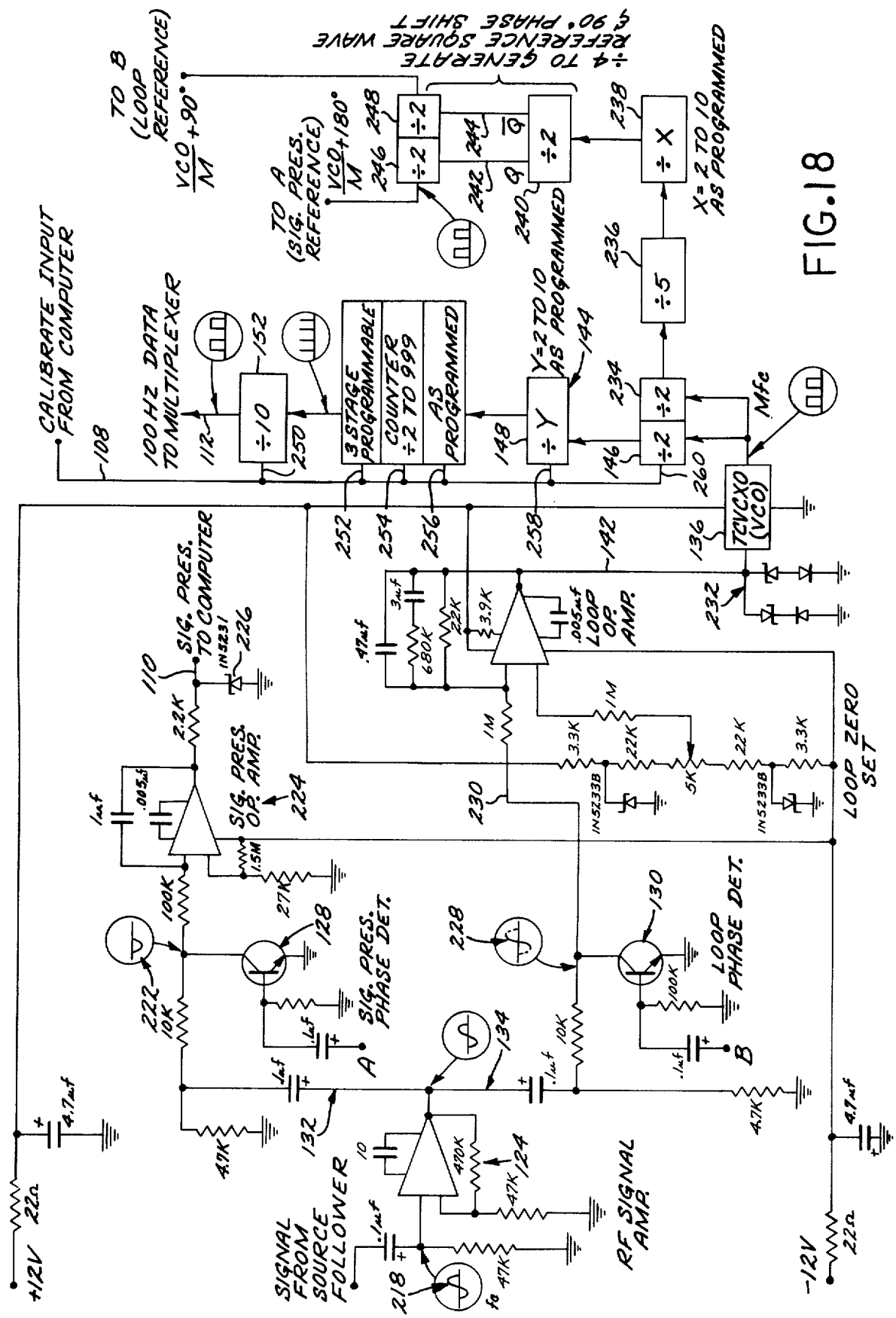
FIG. 18 is a combined detailed circuit diagram of phase-locked loop and signal present circuits, and logic diagram of programmable dividers employed in combination therewith.

Suitable circuit details for a phase-locked loop 126 like that illustrated in block diagram in FIG. 14, as well as logic for the two programmable dividers in the loop 26, are illustrated in FIG. 18 of the drawings.

FIG. 15 shows a suitable circuit arrangement for the broadband preamplifier 116 that is mounted in the antenna housing. Starting at the left side of FIG. 15, the incoming mixture of VLF signals from all stations in range is received by the voltage probe antenna 114, which is a high impedance input, and passes through a diode limiter circuit 154 for high level front end protection. The incoming signals are then applied to a very high impedance FET (field effect transistor) RF amplifier 156, the high impedance thereof minimizing its loading effect due to the high impedance antenna 114.

The output of the RF amplifier 156 passes through a low pass filter 158 and into a second FET RF amplifier 160. The incoming signals are then applied to a phase splitter 162 of unity gain for application to a push-pull amplifier 164, the output of which is applied to a transformer 166 coupled to a floating and shielded twisted signal pair 168 leading to the common equipment housing, and in particular to the transient suppressor 106 therein. This type of connection minimizes common mode and isolation problems. The transformer 166 is a high to low impedance transformer, as for example 10,000 to 500 ohms, to allow a relatively low impedance cable for the twisted pair 168 to the common equipment housing.

Gain of the broadband preamplifier 116 is preferably on the order of from about 30 db to about 40 db.

Circuitry for a suitable transient suppressor 106 is illustrated in FIG. 16. A high level transient 170 is illustrated in the incoming waveform applied to the transient suppressor 106 through the twisted pair 168. If such high level transients were permitted to remain in the signal applied to the receivers, the resulting signal distortion could make lockup more difficult to achieve in the phase-locked loops of the receivers.

The transient suppressor 106 includes a low-to-high impedance isolation transformer 172 having, for example, an impedance ratio of 500 ohms to 10,000 ohms, as the input element to which the twisted cable 168 is connected. The signal then is applied to a clipper 174, wherein positive going transients above a set level place a positive voltage on the base of the NPN transistor 176, shorting the signal to ground for the transient duration; and wherein the PNP transistor does the same for negative transients.

The output element of transient suppressor 106 is an emitter follower 180 which can drive all of the receivers in parallel without loading. The hole 182 remaining in the output signal waveform does not hurt, being eliminated by "ringing" in the respective receiver filters.

Reference will now be made to FIG. 17 which shows suitable circuitry for the narrowband TRF amplifier 118, limiter 120, and high level AGC circuit 122 for one of the receivers. It is to be noted that three ceramic filters are used in the narrowband TRF amplifier and limiter of each receiver for frequency selection, these filters being fixed tuned, providing very good rejection of adjacent station signals, and resulting in a nominal 1% bandwidth.

The narrowband TRF amplifier 118 comprises three stages of FET amplifiers 184, 186, and 188; and two ceramic filters 190 and 192. The input from transient suppressor 106 is applied to the first FET amplifier stage 184, and the output of the narrowband TRF amplifier 118 is applied from FET amplifier 188 through connection 194 to the AGC amplifier 196 forming a part of the high level AGC circuit 122.

Output of the AGC amplifier 196 is applied to the limiter 120 through connection 198. Output of the AGC amplifier 196 is also passed through a carrier detector 200, being filtered and amplified by an amplifier 202 and then applied through connection 204 to the input of the narrowband TRF amplifier 118 serving as the AGC control at the input of the RF receiver.

It is to be noted that the signal waveform 206 at the output of AGC amplifier 196 no longer has the hole 182 that was in the waveform applied to the narrowband TRF amplifier 118. This is because the ceramic filters of the narrowband TRF amplifier "ring through" the missing portion of the wave.

The output from AGC amplifier 196 that is applied to limiter 120 through connection 198 is applied through two stages 208 and 210 of limiters, and then the "limited" square wave signal 212 is passed through a third ceramic filter 214 to a source follower 216 which drives the succeeding phase-locked loop amplifier 124. This third ceramic filter 214 returns the "limited" square wave 212 back into a sine wave 218. This removes any D.C. component that may exist in the square wave 212, thus ensuring a linear operation in the phase-locked loop 126 even under weak signal conditions. If there were a D.C. component in the integrated waveform, this would interfere with signal acquisition by the phase-locked loop 126, particularly under weak signal conditions. Thus, it is important that the signal applied from limiter 120 to phase-locked loop 126 be a sine wave analog signal to eliminate problems of non-linearity.

Reference will now be made to FIG. 18 which combines a suitable circuit diagram for the phase-locked loop 126 and a logic diagram for the programmable dividers.

The sine wave signal 218 from source follower 216 at the output of limiter 120 is applied to RF signal amplifier 124, which is a very wide dynamic range amplifier to preserve the high degreee of linearity present in the signal 218. The output of amplifier 124 is the analog data signal 220, which is fed both to the signal present phase detector 128 and the loop phase detector 130.

The signal present phase detector 128 has a second input, designated A, for a digital reference signal derived from the programmable divider 138. In the locked condition of the phase-locked loop, this digital reference signal to A will be locked 180° advanced relative to the analog data signal 220, whereby the output signal 222 of the signal present phase detector 128 will be a 180° negative waveform. This signal 222 is applied to a signal present operational amplifier 224 which, in this locked condition will provide a positive output voltage at the signal present line 110 to the computer. On the other hand, if the loop 126 is not locked onto an incoming analog data signal 220, then the output of signal present phase detector 128 will be random, so that the signal present operational amplifier 224 will not provide the positive output indication to the computer at the signal present line 110.

A zener diode 226 determines a logic level that is compatible with the computer, as for example + 5 v. or − 1 v. Thus, with the + 5v. signal present indication to the computer on line 110, the computer knows that all data acquired for computation is valid from this particular receiver. The output at line 110 will be approximately zero in the unlocked condition, informing the computer that the data from this receiver is unreliable.

The loop phase detector 130 also has a second input, designated B, which applies a digital reference signal thereto for comparison with the analog data signal 220 that is also applied thereto. In the locked condition of the phase-locked loop 126, this digital reference signal to B will be advanced 90° relative to the analog data signal 220 so as to produce an output waveform 228 having substantially identical positive and negative portions thereof which average out to substantially zero signal applied through connection 230 to the loop operational amplifier 140. Thus, in the locked condition of the phase-locked loop 126, the output of the loop operational amplifier 140 applied to the TCVCXO 136 through connection 142 will be zero so as to hold the present frequency of the TCVCXO 136. Should the analog data signal lead the digital reference signal, the output of loop operational amplifier will swing positive so as to tend to drive the frequency of the VCO 136 higher and thereby bring the analog and digital signals into registry, at which time the output of loop operational amplifier 140 will again become zero. Conversely, should the analog data signal lag the digital reference signal, the output of loop operational amplifier 140 will swing negative, so as to tend to decrease the frequency of VCO 136, until the analog and digital signals again come into registry so as to produce the zero output of loop operational amplifier 140. In this manner, the analog data signal 220 and the digital reference signal applied to the input B of phase detector 130 will be locked in exact quadrature.

A zener diode limiter circuit 232 limits the voltage swing of the output of loop operational amplifier 140 to compatible drive levels for the VCO 136.

It is desirable to keep the phase-locked loop 126 as narrow as possible consistent with acquisition time and the like. For example, the loop constants must be sufficiently long so that during the time an Omega VLF signal is off the air the loop will hold the VCO 136 on frequency for instantaneous acquisition each time the Omega carrier is transmitted, thus retaining valid data at all times. Similarly, the time constants must be sufficiently long so that the signal present indication to the computer from the signal present operational amplifier 224 and line 110 will remain on during the short off times of such an Omega signal.

By providing a TCVCXO 136 which is very frequency stable so as to remain very near the exact frequency $Mf_c$ under all temperature environments, the loop may be made quite narrow and therefore capable of locking up very weak signals. The VCO 136 may either be held in a temperature controlled environment, or temperature compensated to remain extremely accurate over wide temperature variations. The preferred approach for mobile apparatus embodying the invention is to employ a high degree of temperature compensation with the result that oscillations, after division down to the VLF carrier frequency $F_c$, will always be within a fraction of a cycle.

While specific circuit arrangements and component values have been shown in some of the present drawings, it is to be understood that these are presented by way of example only, and not of limitation.

PROGRAMMABLE DIVIDER LOGIC

Reference will now be made to the programmable divider logic diagrammed at the right-hand side of FIG. 18.

As heretofore discussed in connection with FIG. 14, the first programmable divider 138 divides the VCO frequency by a factor or M/4. For convenience, the programmable divider 138 is arranged to include sequential dividing units 234, 236, and 238; the unit 234 dividing the $Mf_c$ frequency by 2; the unit 236 dividing that result by 5; and the unit 238 dividing that result by a factor X which is an integer of from 2 to 10 as programmed, and which will result in a frequency of $4f_c$. Thus, with this arrangement M will be some multiple of 40, the value of X for the dividing unit 238 providing this multiple. Thus, for example, if the value of M is selected to be 200, X will equal 5.

The $4F_c$ frequency output of the dividing unit 238 is fed to a dividing unit 240 which divides by 2 for each of two outputs, a Q output 242, and a $\overline{Q}$ (Q complement) output 244. The Q output 242 goes to a further dividing unit 246 which divides by 2 and produces the digital reference signal to the A input of the signal present phase detector 128. As aforesaid, such digital reference signal has the frequency $F_c$ (which is the VCO frequency divided by M) advanced a full 180° relative to the analog data signal.

The $\overline{Q}$ output 244 goes to a further dividing unit 248 which divides by 2 and produces the digital reference signal to the B input of the loop phase detector 130. As aforesaid, such digital reference signal has the frequency $F_c$ (which is the VCO frequency divided by M) advanced 90° relative to the analog data signal 220.

The normalizing programmable divider generally designated 144 includes sequential divider elements 146, 148, 150, and 152 which divide the VCO frequency $Mf_c$ by the factor N down to 100 Hz. In this dividing sequence, the divider element 146 divides by 2; element 148 divides by a factor Y which is an integer of from 2 to 10 as programmed; the divider element 150 is a three-stage programmable counter which divides by an integer of from 2 to 999 as programmed; and the divider element 152 divides by a factor of 10. The output from the dividing element 152 is the 100 Hz data signal to the multiplexer.

Suitable divider elements which divide by 2 in each instance in both divider trains shown in FIG. 18, are dual flip-flops such as RCA CD4013AE or equivalent. A suitable divider element 52 which divides by 10 is an RCA CD4017AE divider or equivalent. Suitable programmable divider elements, including the element 236 which divides by 5, the element 238 which divides by the integer X of from 2 to 10, the element 148 which divides by the integer Y of from 2 to 10, and the threestage programmable divider element 150, are Motorola Mc14522CL programmable dividers or equivalent.

All of the programmable dividers in the divider chains of FIG. 18, including the X divider 238, the Y divider 148, and the three-stage divider 150, utilize a BCD (binary coded decimal) preset for programming.

In order for the normalized, phase coherent 100 Hz data signals of all of the receivers to be rendered phase synchronous, it is essential that when the computer sends a calibrate signal on the calibrate line 108 to all receivers, this signal produces instantaneous commencement of the 100 Hz data signals simultaneously in all receivers. Since programmable divider circuits of the type presently available will normally count to 10 first before strobing to reset to the proper division ratio, if the counting were permitted to commence on the basis of the reference signals from the digital reference oscillators 136 (all of which will normally have different frequencies), the 100 Hz data signals would not start together and therefore not be phase synchronous. This problem is solved according to the invention by connecting the calibrate line 108 from the computer in parallel to all of the divider counter circuits in the normalizing programmable divider 144 so that all counter circuits commence dividing simultaneously in the normalizing dividers 144 in all receivers. Thus, it will be seen in FIG. 18 that the calibrate line 108 is connected to divider element 152 by connection 250; to the three counters in the three-stage programmable divider 150 by respective connections 252, 254, and 256; to the programmable divider 148 by connection 258; and to the divider 146 by connection 260.

By thus simultaneously starting all of the normalizing counters in all receivers, the phase coherent 100 Hz data signals of all receivers are rendered phase synchronous.

The particular arrays of divider units illustrated in FIG. 18 and described in detail hereinabove in connection with FIG. 18 have been selected to accommodate the currently available VLF transmitting station frequencies; with TCVCXO frequencies in the range of from about 4 MHz to about 5 MHz; with the normalized receiver data output signals having a frequency of 100 Hz; with the divider elements 240–246 and 240–248 dividing by 4 and producing the respective phase shifts of 180° and 90°; and with currently available divider equipment. It is to be understood, however, that the present invention is not limited to these particular arrays of divider elements illustrated in FIG. 18 and described hereinabove, and that other divider arrays may be employed for normalizing the data output signals from all receivers to a common working frequency, and for phase-locking the digital reference signal generators of the various receivers to the respective transmitter station frequencies.

FIGS. 19 to 27 are logic diagrams illustrating suitable programmable divider logic and TCVCXO frequencies for various currently available VLF transmitting stations.

Figure 19:
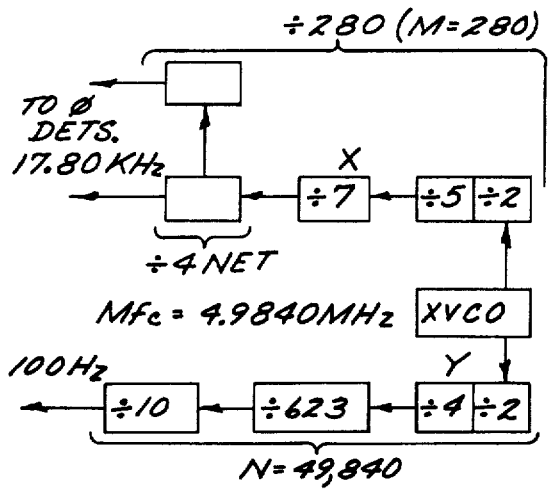
FIG. 19 is a logic diagram for the phase-locked loop of the receiver for a particular VLF transmitting station frequency, indicating the logic of the two programmable dividers employed to divide a selected voltage controlled crystal oscillator frequency respectively to (1) a 100 Hz time reference signal and (2) a station frequency signal suitable phase shifted for loop locking and signal present designation.

The diagram of FIG. 19 is for station NAA at Cutter, Maine, which has a transmitting frequency of 17.80 KHz. For this receiver, M is selected as 280, so that the frequency $Mf_c$ of the TCVCXO (abbreviated XVCO) is 4.9840 MHz. This digital reference signal frequency $Mf_c$ is reduced to station frequency for the signal present and loop phase detectors by having X = 7. The digital reference signal frequency $Mf_c$ is reduced to the 100 Hz data signal frequency by a factor of 10 = 49,840 which is achieved by having Y = 4 and the three-stage programmable divider set to divide by 623.

Figure 20:
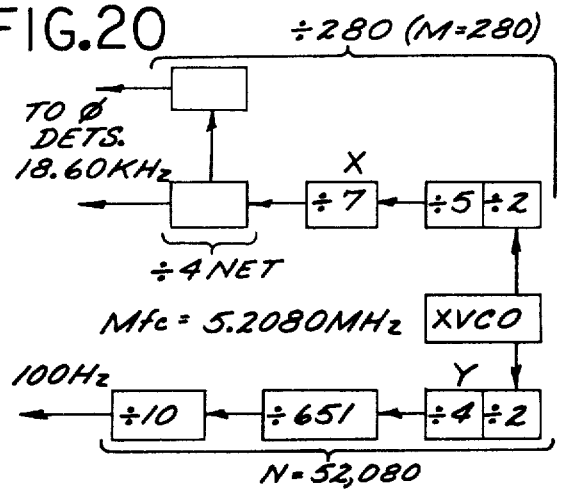
FIGS. 20 to 27 are logic diagrams similar to that of FIG. 19, but applied to other currently available VLF station frequencies.

FIG. 20 is a logic diagram for station NLK at Jim Creek, Washington, having a transmitting frequency of 18.60 KHz. For this receiver, M is also selected to be 280, so that the frequency $Mf_c$ of the oscillator is 5.2080 MHz. This digital reference signal frequency $Mf_c$ is reduced to station frequency for the signal present and loop phase detectors by again having X = 7. The digital reference signal frequency $Mf_c$ is reduced to 100 Hz by a factor of N = 52,080, which is achieved with Y = 4 and the three-stage divider set to divide by 651.

Figure 21:
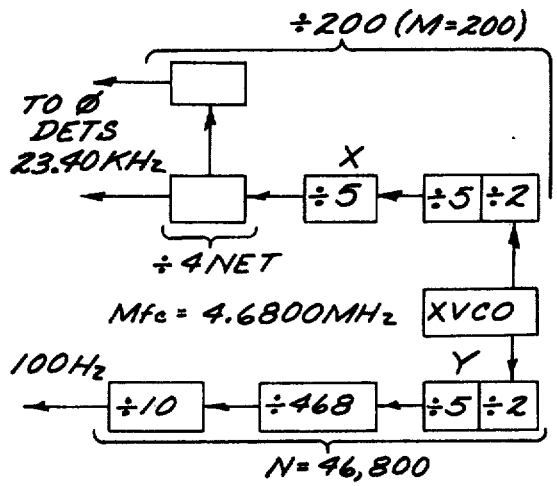

FIG. 21 is for station NPM at Lualualei, Hawaii, which has a transmitting frequency of 23.40 KHz. Here, M is selected as 200, the oscillator frequency being 4.6800 MHz. This digital reference signal is reduced to station frequency for the phase detectors by having X = 5. The digital reference signal frequency $Mf_c$ is reduced to 100 Hz by a factor of N = 46,800, achieved with Y = 5 and the three-stage programmable divider set to divide by 468.

Figure 22:
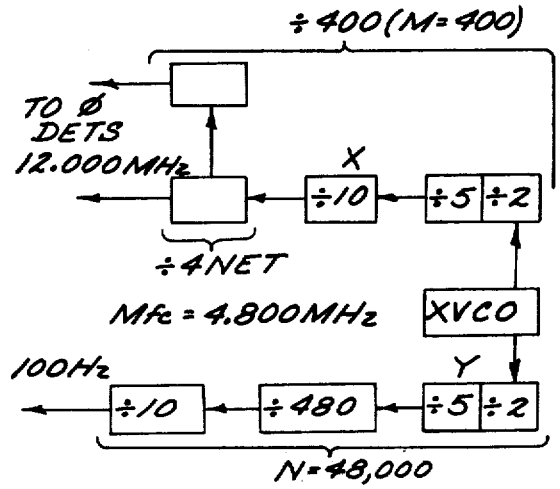

FIG. 22 is for the Trinidad Omega station having a frequency of 12.000 MHz. M is selected at 400, so that $Mf_c$ equals 4.800 MHz. This digital reference signal is reduced to station frequency for the signal present and loop phase detectors by having X = 10; and is reduced to the 100 Hz data signal frequency by factor of N = 48,000, achieved with Y = 5 and the three-stage divider set to divide by 480.

Figure 23:
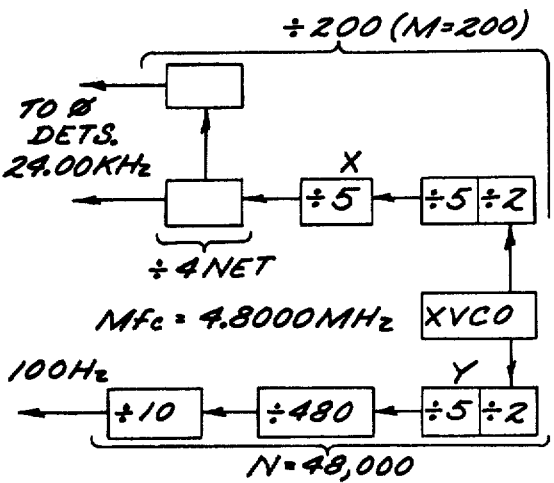

FIG. 23 is a logic diagram for station NBA at the Canal Zone, which has a frequency of 24.00 KHz. Here, M is selected as 200, making $Mf_c$ 4.8000 MHz. This digital reference signal is reduced to station frequency for the phase detectors by having X = 5; and is reduced to 100 Hz by a factor of N = 48,000 that is achieved by having Y = 5 and the three-stage programmable divider set to divide by 480.

Figure 24:
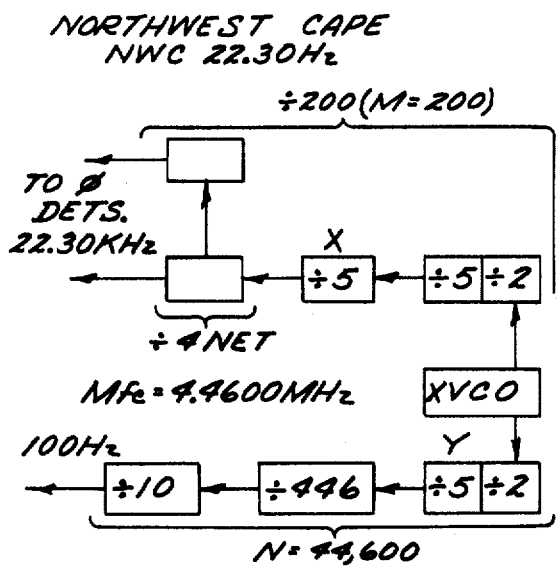

FIG. 24 is a diagram for station NWC at Northwest Cape, Australia, with a frequency of 22.30 KHz. Here, M is selected at 200, $Mf_c$ being 4.4600 MHz; this digital reference signal being reduced to station frequency for the phase detectors by having X = 5; and being reduced 100 Hz by a factor N = 44,600 achieved by having Y = 5 and the three-stage divider dividing by 446.

Figure 25:
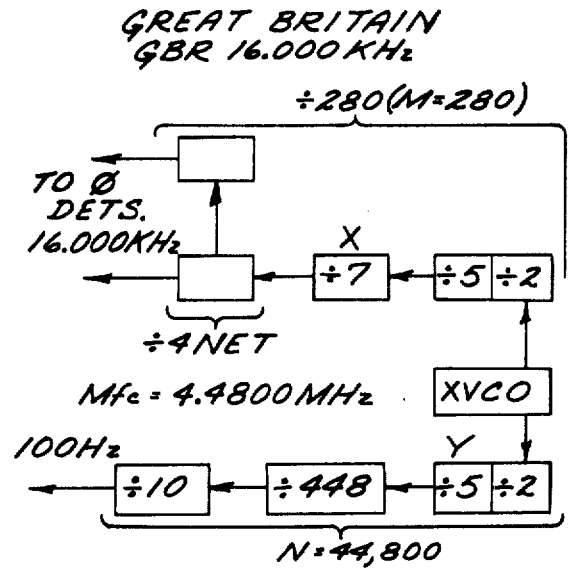

FIG. 25 is a logic diagram for station GRB, Great Britain, with a frequency of 16.000 KHz. There, M is 280, of $Mf_c$ equals 4.4800 MHz. This digital reference oscillator frequency is divided down to station frequency for the phase detectors by having X = 7; and is divided down to 100 Hz by a factor N = 44,800, provided by having y = 5 and the three-stage divider set to divide by 448.

Figure 26:
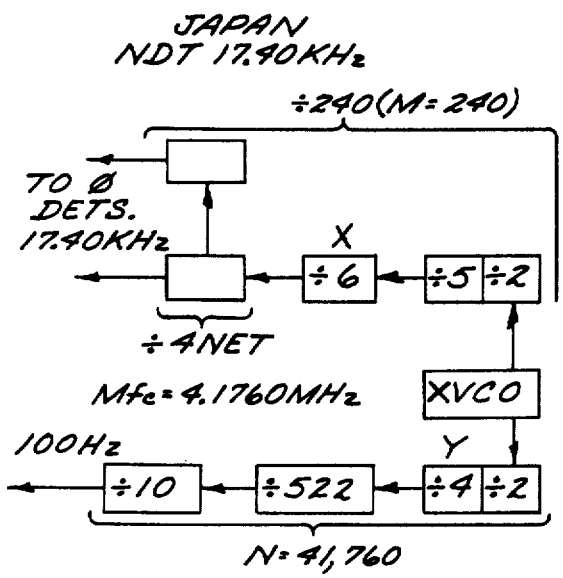

FIG. 26 shows logic for station NDT, Japan, with a frequency of 17.40 KHz. In this case, M is selected at 240 so $Mf_c$ equals 4.1760 MHz; this digital reference signal being reduced to station frequency for the phase detectors by having X = 6; and being reduced to 100 Hz by having N = 41,760, provided by arranging Y = 4 and the three-stage programmable divider set to divide by 522.

Figure 27:
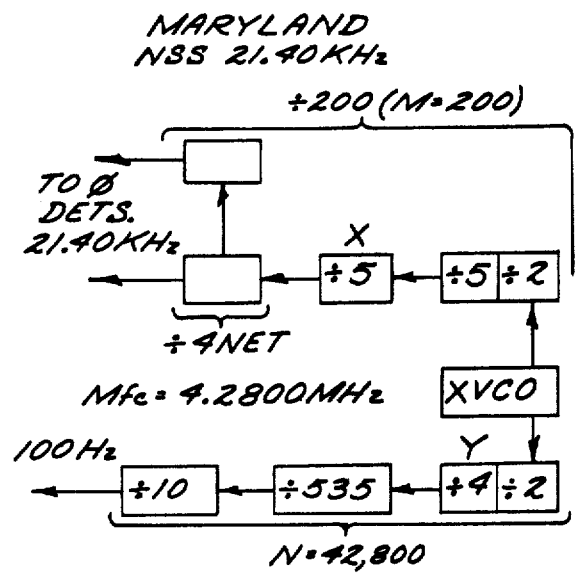

The final station diagrammed in FIG. 27 is station NSS, Maryland, having a frequency of 21.40 KHz. M is selected to equal 200, so that $Mf_c$ equals 4.2800 MHz; this oscillator digital reference signal being divided down to station frequency for the phase detectors by having X = 5; and being divided down to 100 Hz by a factor N = 42,800, produced having Y = 4 and the three-stage programmable divider arranged to divide by 535.

THE MULTIPLEXER

Reference will now be made to FIG. 28 which diagrams the multiplexer and time difference digitizer for determining time difference data sequentially from a series of station pairs selected by the computer. The equipment diagrammed in FIG. 28 is all contained in the multiplexer block 82 in the overall block diagram of FIG. 12.

The multiplexer includes a start station selector 262 and a stop station selector 264. A separate 100 Hz data input line 112 is provided from each of the twelve receivers, and these 12 data input lines are connected both to the start station selector 262 and to the stop station selector 264.

There are 12 start input lines 266 to the start station selector 262 from the computer for the respective receiver input data lines 112; and similarly there are 12 stop input lines 268 to the stop station selector 264 from the computer for the respective receiver data lines 112. The start station selector 262 and the stop station selector 264 are standard one-out-of-twelve decoders, which are standard logic circuits consisting of "and" gates.

When one of the 12 start input lines 266 from the computer to the start station selector 262 has a "high" or "true" level thereon, the 100 Hz data signal from the respective receiver or station is passed to start line 270 as the start signal data. Similarly, when one of the twelve stop input lines 268 from the computer to the stop station selector 264 has a high or true level thereon, the 100 Hz data signal from that respective receiver or station is passed to stop line 272 as the stop signal data.

These start and stop signals from the station pair selected by the computer operate gating circuits designated 274 to gate a 10 MHz clock on and off to allow a finite number of 10 MHz clock pulses through in direct proportion to the phase, and hence time, difference between the start and stop 100 HZ data signals for each cycle thereof. The number of 10 MHz clock pulses that were gated through the gating circuits 274 in a single start/stop sequence of the station pair 100 Hz data signals is counted in a decade BCD (binary coded decimal) counter 278 connected to the output of gating circuits 274. The BCD counter 278 includes five decades for counting up to 100,000 of the clock pulses, and the outputs of the counter 278 are fed directly to the computer through the twenty data lines generally designated 90 as the raw data for all navigational computations in the computer. The number in the counter has a direct relationship to a Δ geographic position from a point at which the receivers were calibrated from the computer through the calibrate line 108, in terms of the phase or time difference between the 100 Hz data signals from the start/stop station pair.

The BCD counter 278 counts the leading edge of each clock pulse of the 10 MHz clock 276 so that it is counting 0.1 microsecond increments, with its maximum counting capacity being up to 100,000 of such 0.1 microsecond increments, or a maximum count period of 0.01 second. However, to avoid ambiguity, the maximum count for the direction of travel will only be ¼ of a 100 Hz cycle (corresponding to approximately 400 nautical miles), which corresponds to 25,000 of the 0.1 microsecond clock increments, or a total time interval of 0.0025 second.

Presently available crystal clock counter accuracy is such as to introduce negligible error in the count data furnished by the BCD counter 278 to the computer.

In order to limit the counting interval to only a single start/stop sequence of the 100 Hz station pair data signals, and to assure that only valid data is taken and that a count is not started in the middle of a start/stop sequence, some additional circuitry is required. This includes the logic generally designated 280 in FIG. 28 which controls the BCD counter 278 through a master reset connection 282 which connects to each decade of the counter 278, and a count-hold control connection 284. The logic unit 280 is controlled by the take data request connection 86 from the computer which provides a take data request pulse to the logic unit 280; and by a connection 286 from the start line 270 which has an inverter 288 therein so as to apply the complement of the start 100 Hz waveform to the logic unit 280.

The computer first selects the start/stop station pair to apply the start and stop data signals through connections 270 and 272 to the gating circuits 274 for gating the 10 MHz clock to the BCD counter 278. Then the computer issues a take data request through the connection 86 to the logic circuitry 280 that controls the counter 278. The logic circuitry 280 insures that the data counted will be a full valid count before it allows the count to be taken, and then it holds the counted data in the counter 278 for the computer to use until the computer issues a new take data request to the logic 280. However, before such new take data request is applied, there will be another start/stop station pair selection by the computer, and the next take data request for the computer will be for the count of this next start/stop station pair. In this manner, the computer sequentially reads out the start/stop station pairs, and as described hereinabove, it is presently preferred to have the computer read six station pairs to obtain three independent longitude/latitude fixes for averging purposes.

Reference will now be made to FIG. 29, which is a logic diagram for the logic unit 280, and to FIGS. 30 and 31 which show time event waveforms for this logic diagram according to two different input condtions to the logic diagram when the take data request is received from the computer.

The start complement waveform is applied through connection 286 to one input of a first and gate 290 which has an output 292 connected to a first flip-flop 294 and also to one input of a second and gate 296. The output 298 of first flip-flop 294 leads to a second flip-flop 300 which has an output 302 connected to the count-hold control connection 284. This output 302 of the second flip-flop 300 is also connected to the second input of each of the and gates 290 and 296. The output 304 of the second and gate 296 is connected to the master reset connection 282 for the BCD divider 278 through an inverter 306. The computer take data request line 86 is connected to the "reset" inputs 308 of the flip-flops 294 and 300.

For convenience in the following discussion, the output of the first flip-flop 294 will be referred to as Q', and the output of the second flip-flop 300 will be referred to as Q. The flip-flops 294 and 300 are both D-type flip-flops; i.e., they are two-stage, data type flip-flops. A computer take data request pulse on line 86, which is a 40 microsecond, 5 volt pulse, will reset both Q and Q' to the high or true condition (from their previous random condition). Q' is adapted to flip over (from high to low or low to high) each time it receives a high or true level from the first gate 290. Q, once set to high, requires a high signal from Q' to be flipped to low.

FIGS. 30 and 31 illustrate the relationships for two different conditions between the waveforms for the start complement, take data request, Q, Q', reset to the BCD counter, and hold for the BCD counter. Reset condition on the connection 282 to the counter is negative; and hold condition on the line 284 to the counter is also negative.

Referring now to condition A as illustrated in FIG. 30, going from left to right in FIG. 30, the line 310 designates the start of a computer take data request pulse. This will cause Q to be high and thereby apply a true level to both and gates 290 abd 296 (this being only one of the two required inputs from both of these gates). Under condition A, the start complement waveform is low when the computer take data request pulse is received. Then, when the start complement goes high, that applies the second true input for the first gate 290 so that the output of gate 290 becomes high. This high output of gate 290 applies one of the required true inputs for the second gate 296, and the other is at that time applied by Q which is high, so the second gate 296 has a high output at 304 which is inverted by 306 to provide a low to the reset connection 282 so as to reset the BCD counter 278. The reset will remain low as long as the start complement is high, thereby disabling the BCD counter at this time from counting.

When the start complement goes low at line 312 in FIG. 30, this causes the output 292 of the first gate 290 to go low or false, which in turns causes the output of the second gate 296 to go low, the inverter 306 applying a high to reset connection 282 making the counter ready to count. When the start complement thus goes low, of course the start in line 270 (FIG. 28) to the gating circuits 274 goes high, thereby gating the 10 MHz clock pulses to the counter which then counts the pulses.

Somewhere in the "count period", defined in FIG. 30 as the negative start complement half cycle (corresponding to the positive start signal half cycle), the "stop" signal from line 272 (FIG. 28) will stop the clock pulse gating through gating circuits 274 and thereby stop the BCD counter 278. This counter data now must be held until the computer is ready for it. Accordingly, after this start complement half cycle, which ends at line 314 in FIG. 30, the start complement again goes high so that the first gate 290 again has a true level output. When the first gate 290 first went high, that flipped Q' to low; and now when the first gate 290 again goes high or true, that flips Q' back to high, and Q' flips Q from high to low.

When Q thus goes low, it applies a low level to one input of both of the gates 290 and 296, thereby closing both gates, and locking both gates in the closed condition until a new take data pulse is received from the computer (since Q will remain the same until the new take data pulse is received).

This low condition of Q at the end of the count period, line 314, applies a low to the count-hold control section 284 to hold the counter. This low condition of Q also, by causing the second gate 296 to lock in the closed condition, applies through inverter 306 a high to reset connection 282 thereby preventing the counter from resetting.

Referring now to FIG. 31, condition B occurs if the take data pulse comes in from the computer when the start signal applied to gating circuits 274 is low, and consequently the start complement is high. It will be seen from FIG. 31 that when this condition occurs, the take request pulse will cause both of the gates 290 and 296 to give a true output, the output of gate 296 causing the BCD counter to be rest immediately. If counting were started at that point, it could be starting in the middle of a start-stop interval, and give an incorrect reading. Accordingly, it is necessary to wait one cycle in order for valid data to be taken. Such delay is accomplished by having the reset connection 282 held in the reset condition until the start complement again goes negative at line 316 in FIG. 31, from which line on the logic will operate in exactly the same manner as for condition A so as to take a valid count.

The logic of FIG. 29 accordingly serves the function of eeffectively obtaining synchronization between the computer and the 100 Hz data signals for counting the start-stop time intervals, since the computer would not otherwise be so synchronized.

Although it is presently preferred to utilize a clock 276 having a frequency of 10 MHz, and a BCD counter 278 that is a 5-section decimal counter permitting a count up to 100,000 of the clock pulses, it is to be understood that other clock frequencies and counter arrangements may be employed within the scope of the invention.

INTERFACE WITH COMPUTER

Figure 32:
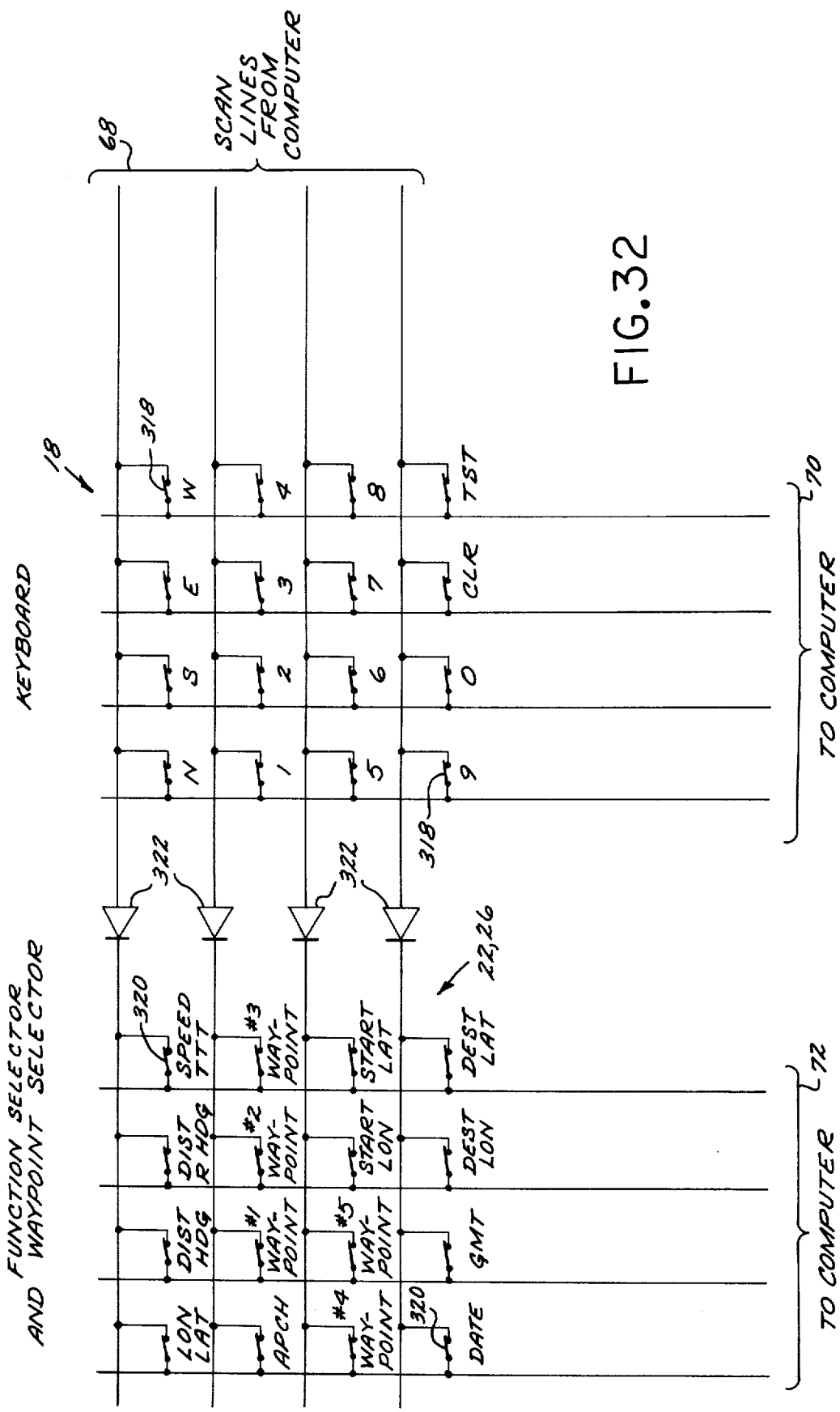
FIG. 32 is a simplified schematic wiring diagram for the control head illustrated in FIG. 2, illustrating how the computer communicates back and forth with the control head which serves principally as an interface with the computer.

FIG. 32 is a simplified schematic wiring diagram illustrating the manner in which the control head 12 serves as an interface between operator and computer.

Four scan lines 68 come from the computer to the control head keyboard 18. These four scan lines 68 are each arranged for selective connection through the keyboard 18 to any one of four keyboard input data lines 70 to the computer by means of respective keyboard switches 318. The computer periodically puts out 4 bits on the scan lines 68 and is adapted to receive four back on the keyboard input data lines 70 according to which of the keyboard switches 318 might be actuated.

The four scan lines 68 from the computer are also each arranged for selective connection through the function switch 22 and waypoint switch 26 to any one of four function/waypoint input data lines 72 to the computer by means of respective contacts 320 for the respective positions of the function switch 22 and waypoint switch 26. The computer is adapted to receive 4 bits back on the function/waypoint input data lines 72 according to the position of the function switch 22 and waypoint switch 26.

It will thus be seen that the computer is a 4-bit machine, putting out 4 bits and receiving 8 bits back, 4 at a time. The four keyboard input lines 70 to the computer are isolated from the four function/waypoint input data lines 72 to the computer by diodes 322 in the respective scan lines 68 intermediate the keyboard switches 318 on the one hand and the function and waypoint switch contacts 320 on the other hand.

COMPUTER

Figure 33:
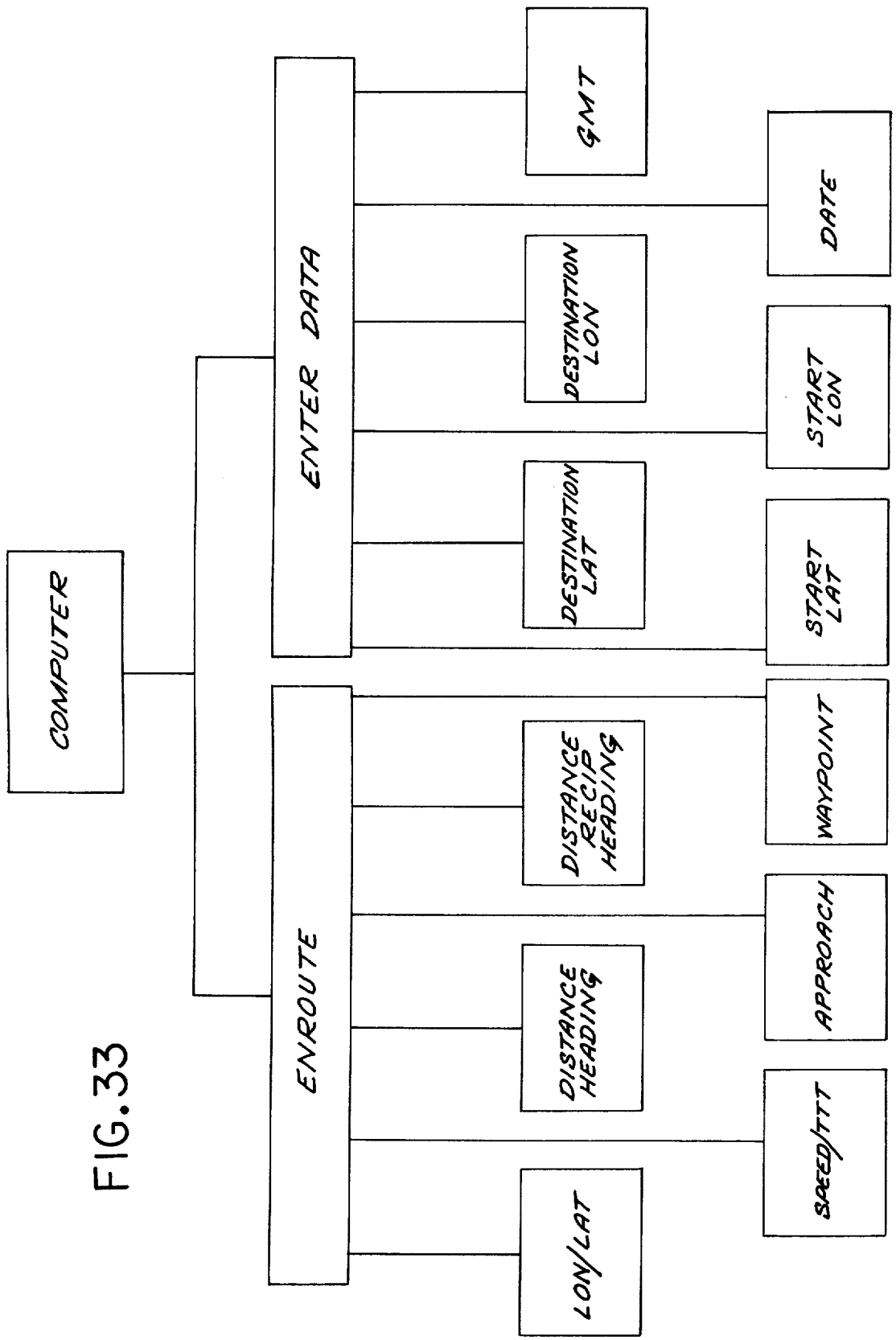
FIG. 33 is a computer algorithm flow chart.

FIG. 33 is a general algorithm flow chart for the computer. There are two general types of algorithms, the "en-route" algorithms and the enter data algorithms. The en-route algorithms basically include algorithms for longitude and latitude; distance and heading; distance and reciprocal heading; speed and time to touchdown; approach mode; and waypoint. The enter data algorithms basically include destination latitude; destination longitude; Greenwich mean time; start latitude; start longitude; and date.

The following is an algorithm outline for the present VLF navigation system which will enable those skilled in the art to satisfactorily implement a computer in accordance with the invention:

I. En-Route Algorithms
  A. Present Position Algorithm — Calculation requires the following:
    1. Determine the geodesic distance from present position to each VLF station using the Androyer Lambert formula.
    2. Determine a diurnal correction factor for the propagation velocity using the standard trapezoidal model. The trapezoidal model requires:
      a. Determine the GMT of sunrise and sunset at each VLF station.
      b. Order the VLF stations in terms of GMT of sunrise and sunset.
    3. Station Pair Selection Algorithm — Calculation requires:
      a. Determine eight station pairs of "acceptable geometry" for a given position. "Acceptable geometry" is a condition placed on pairs of station pairs. This condition represents a compromise between selecting nearly perpendicular pairs of station pairs while including as many avilable (receivable) stations as possible.
      b. Arrange the eight optimal station pairs of decreasing acceptability.
      c. Read time difference data for each station pair (from BCD counter) into the computer for six station pairs maximum. Stations not receivable will be eliminated. This reduces the number of usable station pairs. Two station pairs are required to determine a position. Additional station pairs (up to six) will provide data for averaging purposes. It is predicted that a position can be redundantly determined (three times) over most of the world with twelve well placed VLF stations.
      d. The input time difference data from the stop/start binary coded digit counter must be signed to avoid ambiguity. This is accomplished by the computer. Data between 0 and 25,000 clock pulses is considered positive. Data between 25,000 to 50,000 clock pulses is considered negative, with a value equal to 50,000 minus the data value.
    4. Average the computed positions with all positions not within an acceptable range deleted.
  B. Heading Algorithm — Determined from the present position to a given destination.
  C. Distance algorithm — Determined from present position to a given destination using standard equations.
  D. Ground Speed Algorithm — Determined by dividing a net change in position by the time interval between positions.
  E. Estimated Time to a Waypoint Algorithm — Determined by dividing the distance to the waypoint by the present groundspeed.
  F. Left/Right Track Algorithm — Determined by first calculating the heading from a start point to a destination. This will define the heading necessary to stay on track. Next calculate the heading from the present position to the destination. The "off track" is given by:

Off Track = (Distance to go) sin (heading difference).

II. Enter Data Algorithm
  A. Function Selector Interrogation Algorithm — The computer outputs a four bit code to the control head. This signal is passed back to the computer indicating the function switch position.
    1. Start Longitude (Function switch position) Input Data Handling Algorithm — this includes:
      a. Transfer Data.
      b. Clear Old Data.
      c. Display Input Data.

d. Display North, South, East, West.
e. Calibration.
f. Right Shift Data.
g. Left Shift Data.
h. Convert Input Data — Degrees, minutes are converted to radians.
2. Start Latitude Input Data Handling Algorithm.
3. Date Input Data Handling Algorithm.
4. GMT Input Data Handling Algorithm.
5. Destination Longitude Input Data Handling Algorithm.
6. Destination Latitude Input Data Handling Algorithm.
7. Waypoint Input Data Handling Algorithm.

Figure 34:
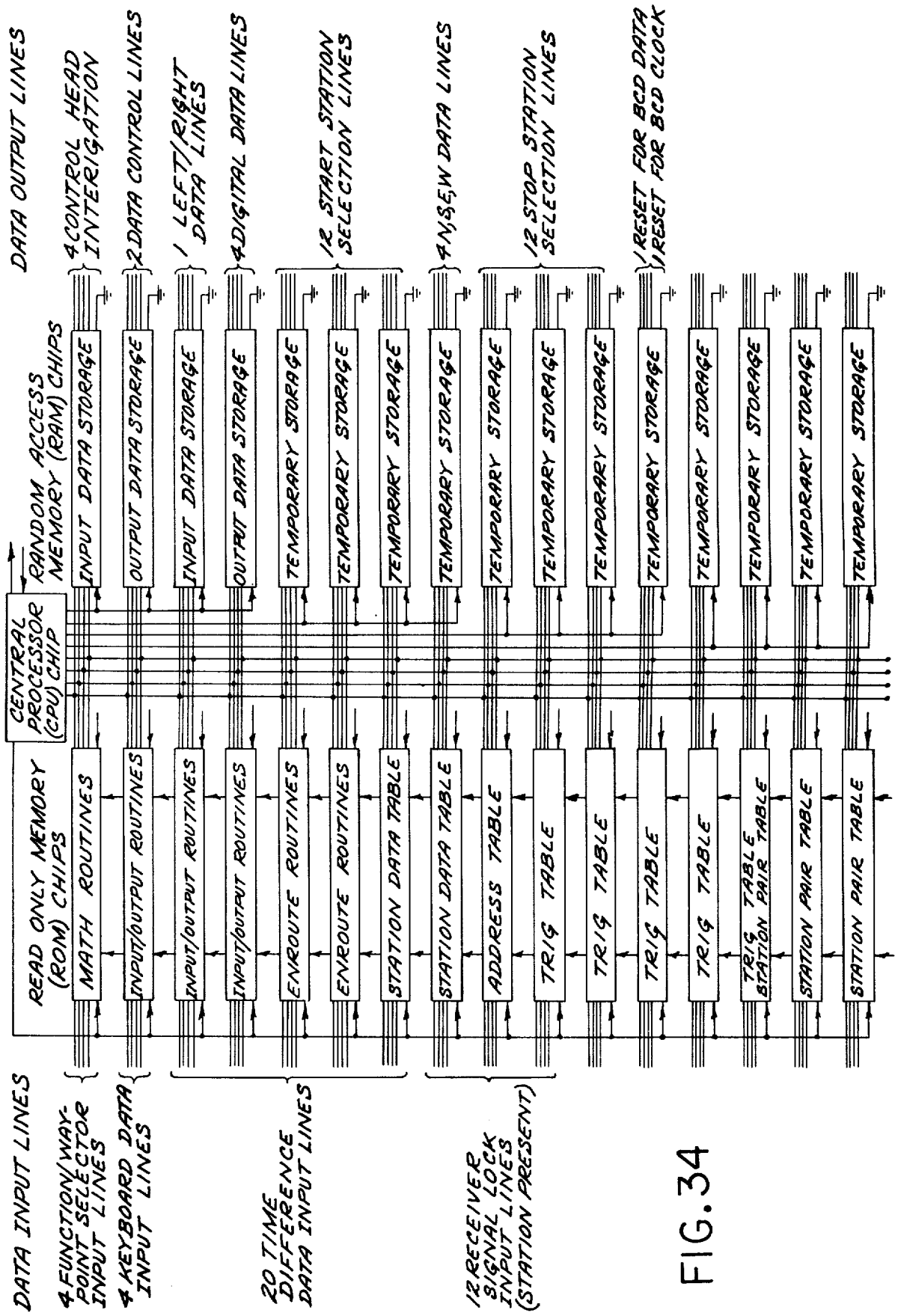
FIG. 34 is a block diagram of a miniaturized computer suitable for performing the necessary computer functions for the present navigation system.

FIG. 34 illustrates a suitable computer, which may be miniaturized, for use in connection with the present navigation system. For hardware convenience, all inputs are through ROM chips, and all outputs are through RAM chips. Details of such a computer, and the manner in which the computer is applied to the present system, including implementation of the various algorithms referred to hereinabove, will be understood by those skilled in the art.

ON BOARD FREQUENCY STANDARD ADAPTATION OF THE SYSTEM

One of the advantages of the hyperbolic coordinate system approach described in detail hereinabove is the avoidance of the need for a very accurate on-board time standard with its resulting weight and cost penalties. Nevertheless, the present system is equally adaptable for use of an on-board time standard, and such adaptation is illustrated in FIGS. 35 through 41 of the drawings.

There are several advantages in using an on-board time standard in the present system. One advantage is that the system will operate in a Rho-Rho mode with the on-board time standard, requiring only two VLF transmitting stations to obtain a position update, instead of the minimum of three stations required in the hyperbolic mode. This reduction in the number of required input signals provides a substantial improvement in total system reliability, and only four stations are required for good station averaging, rather than six. Another advantage with the on-board frequency standard is that station location geometry is not as restrictive as with the hyperbolic approach, two-station geometry having a much wider geographical area of acceptability than three-station geometry. Accordingly, station pair selection is not in any way critical.

In the present VLF navigation system it is preferred that the on-board frequency or time standard have a short term stability of about $1 \times 10^{-11}$, and an aging rate per year of about $1 \times 10^{-10}$. While any atomic clock controlled frequency or time standard with this general order of accuracy may be employed, it is preferred to utilize a standard of minimum weight, space occupancy, and power consumption. A suitable standard currently available is a rubidium standard produced by Efratom California, Inc., 3303 Harbor Boulevard, Suite E1—E2, Costa Mesa, California 92626.

FIG. 35 graphically illustrates a Rho-Rho coordinate system of VLF lines of constant phase for two geographically spaced transmitting stations A,B. Present position is seen to be defined in this system by the coordinates $\rho A$, $\rho B$. The algorithm for updating position en route in this coordinate system will be described hereinafter in connection with FIGS. 39, 40, and 41.

The on-board frequency standard is easily implemented using the exact hardware previously described in detail for the navigation system. The frequency standard produces an RF signal which is reduced or normalized to the same low frequency as the VLF receiver data signals, e.g., 100 Hz. A suitable RF frequency for the standard is 10 MHz, which is reduced to a 100 Hz square wave that is very stable in time. This 100 Hz reference data signal is fed into the multiplexer in place of one of the VLF receiver 100 Hz data signals.

The computer is programmed to obtain time difference data by selecting station pairs in each of which the on-board time standard is one station and one of the transmitting VLF stations is the other station (in the hyperbolic system the computer selected pairs of VLF transmitting stations which had desirable geometry). Station pair selection comprises selection by the computer of one of the VLF transmitting stations as the "start" station, and utilization of the on-board frequency standard as the "stop" station. Thus, while sequential station pairs will include different VLF transmitting stations for the start signal, the on-board frequency standard station is always provided as the stop signal. This enables the station pair tables to be deleted from the computer illustrated in FIG. 34 for the on-board standard form of the invention.

FIGS. 36, 37 and 38 diagrammatically illustrate this utilization of the on-board frequency standard as the stop stations, as compared with the use of VLF transmitting stations as the stop stations in the hyperbolic form of the invention. Thus, FIG. 36 illustrates a modifiction of the overall block diagram in FIG. 12 to include the on-board frequency standard 400 connected through line 402 to the multiplexer 82 for providing 100 Hz reference data utilized as the stop signals for the station pairs. Connection 88a now simply represents start station selection control lines. Otherwise the overall block diagram of FIG. 12 remains the same.

FIG. 37 represents a modification of the input block diagram of FIG. 13 to include the on-board frequency standard for provision of its extremely stable 100 Hz data signal to the multiplexer. It will be noted that the frequency standard, like the receivers, has a signal present output indicating that it is locked on frequency. It will also be noted that the calibrate line 108 from the computer to the phase locked loop dividers has been omitted from FIG. 37. This is because the highly stable on-board time standard may be used in this form of the invention as the basis for calibration. Instead of sending out a pulse to calibrate all of the stations, the calibration is accomplished with computer software. Thus, the on-board standard is allowed to be "free running", and an initial position phase comparison reading will be made of each VLF transmitting station 100 Hz signal relative to the on-board standard 100 Hz signal and stored in the computer memory. This initial reading for each VLF transmitting station is then subtracted out for each position update. Accordingly, calibration in this form of the invention is accomplished by the taking of these initial phase readings for the respective VLF transmitting stations and storing them in the computer.

Since all of the VLF transmitting stations utilized in the system, and also the on-board frequency standard, are atomic clock controlled, the resulting 100 Hz (or other suitable data frequency) signals are all atomic clock controlled and therefore highly phase stable relative to each other at any particular geographical position. Accordingly, these 100 Hz data signals derived from the VLF stations and the on-board standard are hereby defined as having a "phase coherent" relationship. With the aforesaid computer-stored initial reading type of calibration, it is not necessary for this phase coherent relationship to be also phase synchronous as was the relationship of the receiver 100 Hz signals when they were pulse-calibrated in the hyperbolic system.

Referring now to FIG. 38, it will be seen that the stop station selecter 264 of FIG. 28 is no longer required, inasmuch as the frequency standard 400, in its 100 Hz reference signal, provides the stop station signals to the gating circuits 274 through connection 402. The start station selecter 262 is connected in the same manner as in FIG. 28 both to the receivers and to the computer, and provides the start signals to the gating circuits 274 through connection 270.

This use of the on-board atomic frequency standard in the VLF navigation system can greatly simplify the algorithm for updating position en route. By measuring the time difference of the 100 cycle data between a given receiver and the on-board standard, measurement of the distance change (excluding diurnal shifts) is obtained. This "delta distance" is measured by taking the initial time difference (Ti) at the time the station becomes available for use. At succeeding intervals of time, further measurements are made (Tc). The delta distance is proportional to Tc — Ti. The proportionality constant is equal to the inverse of the propagation constant Cc.

$$\text{Thus } \Delta d = \frac{Tc - Ti}{Cc}$$

Figure 39:
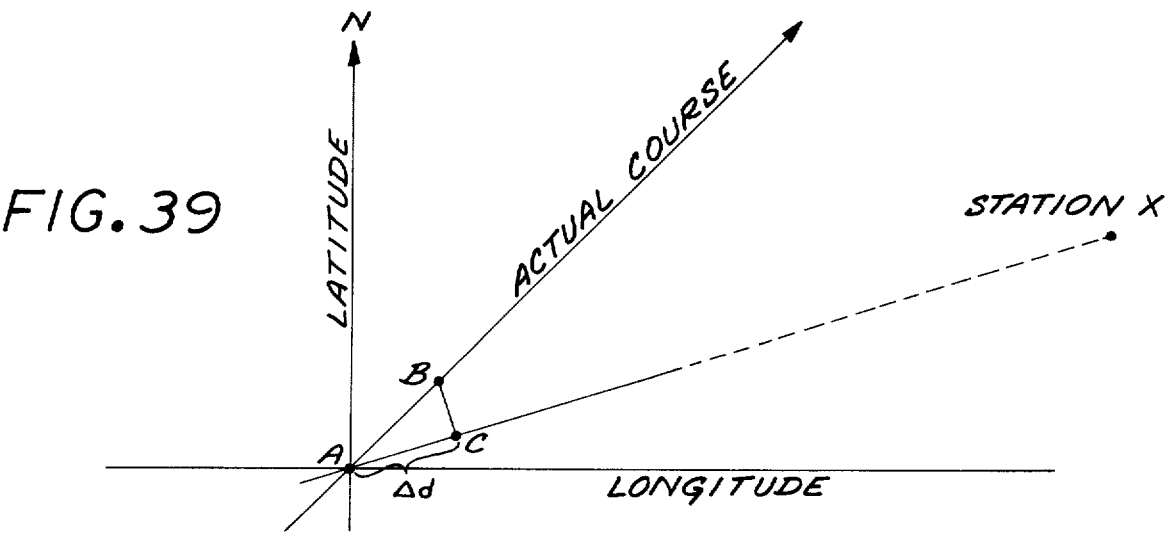
FIGS. 39, 40, and 41 graphically illustrate the algorithm for updating position en route with the on-board frequency standard providing one station of each station pair utilized in the computation.

Once the $\Delta d$ for a station has been determined, the next step is to update the current latitude and longitude. If the distance to the station from the current (previous) LAT/LON is known, $\Delta d$ can be used to update both latitude and longitude along the line between the present position and the station. Referring to FIG. 39, if we move along our course from A to B, we generate a $\Delta d$ based on our measured time difference. If our LAT/LON at $A = (\phi_1\gamma_1)$, we need to find LAT/LON at $C = (\phi_2\gamma_2)$. By geometry, if we determine the heading to the station X we know that $$\Delta\phi_2 = \frac{\Delta d}{R} \times \cos\theta$$

$$\Delta\gamma_2 = \frac{\Delta d}{R} \times \sin\theta \times \cos(\phi_2)$$

where R = radius of the earth. (The above formulae are good for short distance only where "flat map" approximations may apply). Thus we have determined our change in latitude and longitude along the line to the station.

Figure 40:
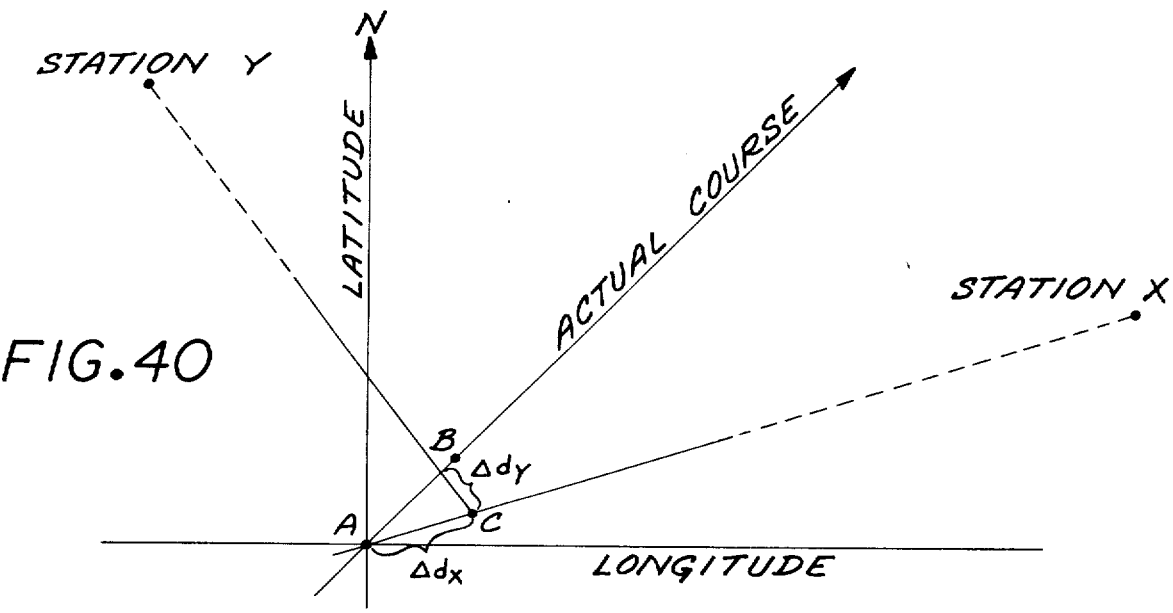

As illustrated in FIG. 40, by using another station not colinear with the first, we can get a second line of position. By adding the $\Delta\phi,\Delta\gamma$ generated by the line of position CY, a better approximation to point B along the course is obtained. Thus if we use two stations and continually update the longitude and latitude using the stations alternately, we can approximate any course on the earth's surface.

Figure 41:
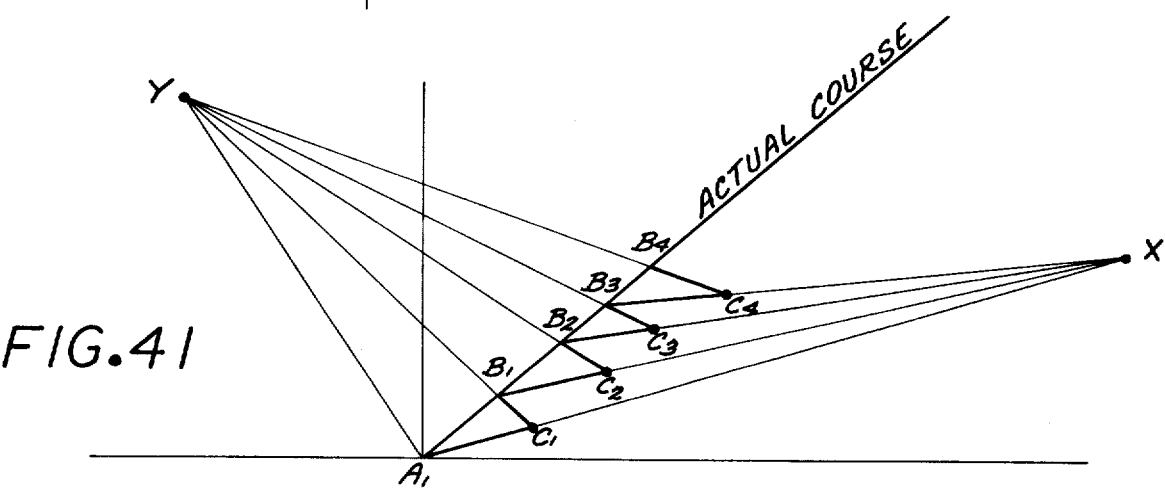

As can be seen from FIG. 41, the uncertainty of position caused by geometry increases as present position becomes colinear with the line XY. We then can use as many stations as are available to improve our course approximation by averaging the several positions obtained.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the appended claims.

We claim:

1. The navigation method which comprises simultaneously obtaining a pair of RF signals of different frequency originating at geographically spaced RF stations, simultaneously normalizing the said RF signals into respective first and second coherent signals of a common frequency, measuring the phase relationship between said normalized signals at a first geographical location, measuring the phase relationship between said normalized signals at a second geographical location, and determining the degree of change in said relationship to determine $\Delta$ position information.

2. The method of claim 1, wherein at least one of said RF signals is a VLF signal transmitted from a remote station.

3. The method of claim 1, wherein one of said RF signals is an on-board time standard obtained from an on-board station.

4. The method of claim 1, wherein said normalized signals have a phase coherent relationship.

5. The method of claim 4, wherein said phase coherent relationship is established by having both of said RF signals referenced to atomic time standards.

6. The method of claim 4, wherein said phase coherent relationship is a phase synchronous relationship.

7. The method of claim 1, which utilizes a Rho-Rho system of coordinates.

8. The method of claim 1, which utilizes a hyperbolic system of coordinates.

9. The method of claim 1, wherein said normalized signals comprise first and second digital waveforms, and said phase shift is measured by providing a string of high frequency electrical clock pulses, gating said clock pulses on by a leading edge of said first waveform, gating said clock pulses off by the corresponding leading edge of said second waveform, and counting the gated pulses.

10. The method of claim 1, wherein at least one of said RF signals is normalized by providing an oscillator signal for said one RF signal which has a frequency that is a multiple of said one RF signal frequency, said oscillator frequency being divisible by an integer to said common frequency, phase locking said oscillator signal to said one RF signal, and dividing said oscillator signal by said integer to produce the normalized signal.

11. The method of claim 1, wherein at least two of said pairs of RF signals are obtained from respective RF station pairs providing at least two independent items of $\Delta$ position information.

12. The method of claim 11, wherein all of said RF signals are normalized to said common frequency.

13. The method of claim 12, wherein said phase shifts between the normalized signal pairs for all station pairs are measured successively by the same measuring means.

14. The method of claim 13, wherein said normalized signal pairs each comprise first and second digital waveforms, and said phase shifts are measured by providing a string of high frequency electrical clock pulses, gating said clock pulses on by a leading edge of said first waveform of a first said normalized signal pair and off by the corresponding leading edge of said second waveform of that normalized signal pair, and then gating said clock pulses on by a leading edge of the first of a second said normalized signal pair and off by the corresponding leading edge of said second waveform of that normalized second signal pair.

15. The method of claim 11, wherein at least four of said pairs of RF signals are obtained from respective RF station pairs, and wherein a plurality of separate Δ positions are calculated and averaged from said station pairs.

16. The method of claim 15, wherein any Δ position calculation unreasonably departing from the average Δ position is rejected.

17. The method of claim 11, wherein a diurnal shift correction is applied.

18. The method of claim 1, wherein said common frequency is within the range of from about 10 to about 1000 Hz.

19. The method of claim 1, wherein said common frequency is about 100 Hz.

20. The navigation method of claim 1, wherein both of said RF signals are intercepted from RF electromagnetic signals transmitted by geographically spaced RF transmitting stations.

21. The method of claim 20, wherein said RF signals are VLF signals.

22. The method of claim 20, wherein said RF signals are normalized by providing an oscillator signal for each of said RF signals which has a frequency that is a multiple of its respective RF signal frequency, said oscillator frequencies each being divisible by a respective integer to said common frequency, phase locking each of said oscillator signals to its respective said RF signal, and dividing said oscillator signals by their respective said integers to produce said normalized signals.

23. The method of claim 22, wherein said phase relationship is a phase coherent phase relationship, and synchronizing said phase coherent relationship by initiating said dividing of said oscillator signals simultaneously.

24. The method of claim 23, wherein said dividing of each of said oscillator signals is done by respective programmable dividers each having a plurality of divider sections, and wherein said phase synchronous relationship is established by initiating the division simultaneously in all of said programmable divider sections.

25. An RF navigation system which comprises means for obtaining simultaneously a pair of RF signals of different frequency originating at respective geographically spaced RF points, at least one of said signal obtaining means comprising a receiver tuned to receive a respective one of said RF signals, frequency normalizing means for normalizing said RF signals into respective normalized signals of a common frequency, measuring means connected to said normalizing means for measuring the phase relationship between said normalized signals on a first occasion and on a second and subsequent occasion; and phase change measuring means for determining Δ position information.

26. A system as defined in claim 25, wherein said RF signal to which said receiver is tuned is a VLF signal.

27. A system as defined in claim 25, which includes an on-board time standard that produces one of said RF signals at an on-board station.

28. A system as defined in claim 25, wherein said receiver includes a phase-locked loop for its respective said RF signal.

29. A system as defined in claim 28, wherein said frequency normalizing means associated with said receiver comprises an oscillator in said loop having a frequency that is a multiple of the respective RF signal frequency, said oscillator frequency being divisible by an integer to said common frequency, and divider means connected to said oscillator and arranged to divide the oscillator signal by said integer to produce the respective said normalized signal.

30. A system as defined in claim 29, wherein said oscillator is a temperature compensated voltage controlled crystal oscillator.

31. A system as defined in claim 29, wherein said divider means comprises a programmable divider.

32. A system as defined in claim 29, which includes second divider means in said loop which is arranged to divide said oscillator frequency down to the respective RF signal frequency to provide a digital reference signal for locking the loop.

33. A system as defined in claim 32, wherein said second divider means in said loop comprises a programmable divider.

34. A system as defined in claim 32, which includes phase detector means in said loop having an output connected to the respective oscillator to hold the oscillator frequency to its respective multiple of its respective RF signal frequency, said phase detector means having a first input connected to receive said RF signal as an analog data signal and a second input connected to said second divider means to receive said digital reference signal.

35. A system as defined in claim 34, which includes second phase detector means in said loop having an output arranged to have a "signal present" electrical signal thereon, said second phase detector means having a first input connected to receive the respective said RF signal as an analog data signal and a second input connected to said second divider means to receive said digital reference signal.

36. A system as defined in claim 25, which includes means for obtaining at least two respective pairs of said RF signals from respective RF station pairs, and wherein said phase shift measuring means is adapted to measure the phase shift for each pair of normalized signals at said second geographical location to determine at least two independent items of Δ position information.

37. A system as defined in claim 36, wherein all of said RF signals are normalized to said common frequency.

38. A system as defined in claim 37, wherein said phase shift measuring means is arranged for successively measuring said phase shifts between the normalized signal pairs for all of said station pairs.

39. A system as defined in claim 38, wherein said normalized signal pairs each comprise first and second low frequency digital waveforms, said phase shift measuring means comprising gating circuit means, first and second input connections to said gating circuit means applying the respective said first and second waveforms to said gating circuit means, a clock connected to said gating circuit means and providing a string of high frequency electrical pulses to said gating circuit means, an output from said gating circuit means, and counting means having an input connected to said gating circuit means output for counting gated clock pulses, said gating circuit means being adapted to gate said clock pulses to said counting means by a leading edge of said first waveform and to gate off said clock pulses from said counting means by the corresponding leading edge of said second waveform, whereby the number of said clock pulses counted by said counting means will be in direct proportion to said phase difference.

40. A system as defined in claim 39, wherein said counting means comprises a BCD counter.

41. A system as defined in claim 39, which includes multiplexer means connected to the normalized signal outputs of a plurality of said receivers and connected to at least one of said gating circuit input connections, computer means connected to said multiplexer means and adapted to successively select and connect said receiver outputs to said one gating circuit input connection, and an electrical connection from said computer means to said counter for applying a take data starting pulse to said counter for starting the counter after each of said selections.

42. A system as defined in claim 41, which includes an on-board time standard that produces one of said RF signals of each of said RF signal pairs at an on-board station, whereby one of the normalized signals of each of said signal pairs is derived from said on-board time standard.

43. A system as defined in claim 42, wherein the normalized signal output of said on-board time standard is connected to the other said gating circuit input connection.

44. A system as defined in claim 43, wherein said first low frequency digital waveforms are the normalized signal outputs of said receivers, and said second low frequency digital waveforms are the normalized signal output of said on-board time standard.

45. A system as defined in claim 41, wherein said multiplexer means is connected to both of said gating circuit input connections, said computer means being adapted to successively connect start-stop pairs of said receiver outputs to said first and second gating input circuit connections.

46. A system as defined in claim 41, which includes logic circuit means in said "take data" connection responsive to the first waveform of each waveform pair to delay the counting after the respective said take data starting pulse until said leading edge of said first waveform in one of the cycles thereof is received so as to assure the counting of a valid phase difference interval between said waveforms.

47. A system as defined in claim 36, which includes computer means connected to said phase shift measuring means and programmed to calculate a Δ position.

48. A system as defined in claim 47, which includes at least four of said receivers tuned to at least four respective said RF signals from respective RF stations, and wherein said phase shift measuring means is adapted to measure the phase shift for each pair of normalized signals at said second geographical location to determine Δ position information from said first position for at least four station pairs, said computer means being programmed to calculate and average a plurality of separate Δ positions.

49. The method of claim 48, wherein said computer means is programmed to reject from the average any Δ position unreasonably departing from the average Δ position.

50. A system as defined in claim 47, wherein said computer means is programmed to apply a diurnal shift correction to said Δ position calculation.

51. A system as defined in claim 47, wherein said computer means is programmed to provide present position information from said Δ position calculation.

52. A system as defined in claim 47, wherein said computer means is programmed to provide left/right steering track information from said Δ position calculation.

53. A system as defined in claim 47, wherein said computer means is programmed to provide distance information to a target location from said Δ position calculation.

54. A system as defined in claim 47, wherein said computer means is programmed to provide heading information from said Δ position calculation.

55. A system as defined in claim 47, wherein said computer means is programmed to provide speed information from said Δ position calculation.

56. A system as defined in claim 47, wherein said computer means is programmed to provide time to a target location from said Δ position calculation.

57. A system as defined in claim 25, wherein said common frequency is within the range of from about 10 to about 1000 Hz.

58. A system as defined in claim 25, wherein said common frequency is about 100 Hz.

59. An RF navigation system as defined in claim 25, which comprises antenna means for intercepting both of said RF signals of different frequency from RF electromagnetic signals transmitted by respective geographically spaced RF transmitting stations, both of said signal obtaining means comprising receivers connected to said antenna means and tuned to the respective RF signal frequencies.

60. A system as defined in claim 59, wherein said RF signals are VLF signals.

61. A system as defined in claim 59, wherein each of said receivers includes a phase-locked loop for its respective said RF signal.

62. A system as defined in claim 61, wherein said frequency normalizing means comprises an oscillator in each of said loops having a frequency that is a multiple of the respective RF signal frequency, said oscillator frequencies each being divisible by a respective integer to said common frequency, and divider means connected to each of said oscillators and arranged to divide the respective oscillator signal by the respective said integer to produce the respective said normalized signal.

63. A system as defined in claim 62, wherein said divider means in each loop comprises a programmable divider.

64. A system as defined in claim 63, wherein each of said programmable dividers is a milti-stage divider, and said calibration means is connected to each stage of each divider so as to simultaneously initiate operation of all divider stages.

65. A system as defined in claim 59, wherein said RF signals are VLF signals, said antenna means comprising a common antenna for both of said receivers, and including broadband preamplifier means connected between said antenna and said receivers.

66. A system as defined in claim 65, wherein said preamplifier is located proximate said antenna means.

67. A system as defined in claim 65, wherein each of said receivers includes a narrowband TRF preamplifier tuned to the respective said RF signal frequency.

68. The navigation method which comprises the steps of:
- receiving at least one radio signal from a distant radio station;
- developing a pair of cyclically varying electrical signals having known like frequency and differing in phase by an amount corresponding to the difference in phase between two other cyclically varying electrical signals one of which is said radio signal; and
- measuring the time interval between occurance of corresponding portions of the cycles of said first-mentioned pair of cyclically varying electrical signals.

69. The invention defined in claim 68 which comprises the further step of generating a train of clock pulses and in which each of said first-mentioned pair of cyclically varying electrical signals is made to have pulse wave shape; and
- in which the difference in phase between said first-mentioned pair of cyclically varying electrical signals is measured by measuring the number of clock pulses that occur in the interval between corresponding portions of said pulse wave shapes.

70. The invention defined in claim 68 in which said pair of cyclically varying electrical signals comprise radio signals from distant, and spaced radio stations.

71. A navigation system comprising in combination:
- means for developing two cyclically varying electrical signals differing in frequency and at least one of which corresponds in phase and frequency to the signal arriving from a distant radio station;
- frequency normalizing means for normalizing said pair of cyclically varying electrical signals into first and second normalized signals having common frequency and being coherent in time;
- means responsive to like conditions in each of said first and second normalized signals for measuring the phase difference between said first and second normalized signals as a time interval.

72. The invention defined in claim 71 in which said means for measuring the phase difference between said first and second normalized signals comprises means in the form of a clock for generating a train of pulses and means for counting the number of pulses that occur between the occurance of an event in said first normalized signal and the occurance of a corresponding event in said second normalized signal.

73. The invention defined in claim 71 in which each of said pair of cyclically varying signals is derived from a distant radio station.

* * * * *

Disclaimer

3,936,828.—*Allen R. Muesse;* Orange and *Jess C. Wright,* El Cajon, Calif. VLF NAVIGATION SYSTEM. Patent dated Feb. 3, 1976. Disclaimer filed June 18, 1981, by the assignee, *Rockwell International Corp.*

Hereby enters this disclaimer to all claims of said patent.
[*Official Gazette August 18, 1981.*]